United States Patent
Lee

(10) Patent No.: US 10,162,955 B2
(45) Date of Patent: Dec. 25, 2018

(54) MOBILE TERMINAL AND METHOD FOR CONTROLLING SAME

(71) Applicant: LG ELECTRONICS INC., Seoul (KR)

(72) Inventor: Wonhee Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 62 days.

(21) Appl. No.: 15/121,356

(22) PCT Filed: Feb. 25, 2015

(86) PCT No.: PCT/KR2015/001816
§ 371 (c)(1),
(2) Date: Aug. 24, 2016

(87) PCT Pub. No.: WO2015/137645
PCT Pub. Date: Sep. 17, 2015

(65) Prior Publication Data
US 2016/0364561 A1    Dec. 15, 2016

(30) Foreign Application Priority Data

Mar. 13, 2014 (KR) .................. 10-2014-0029485
Oct. 14, 2014 (KR) .................. 10-2014-0138151

(51) Int. Cl.
*G06F 21/32*    (2013.01)
*H04M 1/67*    (2006.01)
(Continued)

(52) U.S. Cl.
CPC ......... *G06F 21/32* (2013.01); *G06K 9/00255* (2013.01); *G06K 9/00281* (2013.01);
(Continued)

(58) Field of Classification Search
CPC .................................................. H04N 5/2251
See application file for complete search history.

(56) References Cited

U.S. PATENT DOCUMENTS 8,542,879 B1 *  9/2013  Nechyba ............ G06K 9/00228
                                                              382/103
2006/0050933 A1   3/2006  Adam et al.
(Continued)

FOREIGN PATENT DOCUMENTS

EP      2605169       6/2013
KR   10-2013-0054767   5/2013

OTHER PUBLICATIONS

European Patent Office Application Serial No. 15761314.2, Search Report dated Sep. 18, 2017, 13 pages.
(Continued)

*Primary Examiner* — Josnel Jeudy
(74) *Attorney, Agent, or Firm* — Lee, Hong, Degerman, Kang & Waimey

(57) ABSTRACT

The present invention relates to a mobile terminal and a method for controlling the same, the mobile terminal comprising: a camera; a display unit for displaying an image inputted through the camera; and a control unit which performs a user authentication on the basis of a received first facial image when the first facial image including facial features necessary for the user authentication is received through the camera, and which performs a user authentication by using at least one facial feature included in a received second facial image when the second facial image which lacks a part of the facial features is received.

19 Claims, 23 Drawing Sheets

(51) Int. Cl.
*G06K 9/00* (2006.01)
*G06K 9/22* (2006.01)

(52) U.S. Cl.
CPC ..... *G06K 9/00288* (2013.01); *G06K 9/00912* (2013.01); *G06K 9/22* (2013.01); *H04M 1/67* (2013.01); *H04M 2250/52* (2013.01)

(56) References Cited

U.S. PATENT DOCUMENTS

| | | | |
|---|---|---|---|
| 2007/0049803 A1* | 3/2007 | Moriyama | A61B 1/00096 600/176 |
| 2009/0090577 A1* | 4/2009 | Takahashi | A61B 5/117 180/272 |
| 2010/0194571 A1 | 8/2010 | Ortiz et al. | |
| 2012/0242820 A1 | 9/2012 | Hanna et al. | |
| 2013/0182915 A1 | 7/2013 | Hanna | |
| 2013/0216108 A1* | 8/2013 | Hwang | G06K 9/00926 382/118 |
| 2013/0243264 A1 | 9/2013 | Aoki | |
| 2013/0254862 A1 | 9/2013 | Sampas | |

OTHER PUBLICATIONS

Liao, S. et al., "Partial Face Recognition: Alignment-Free Approach", IEEE Transactions on Pattern Analysis and Machine Intelligence, XP011497452, May 2013, 13 pages.
PCT International Application No. PCT/KR2015/001816, Written Opinion of the International Searching Authority dated May 14, 2015, 16 pages.
European Patent Office Application Serial No. 15761314.2, Search Report dated Oct. 5, 2018, 14 pages.

* cited by examiner

FIG. 3
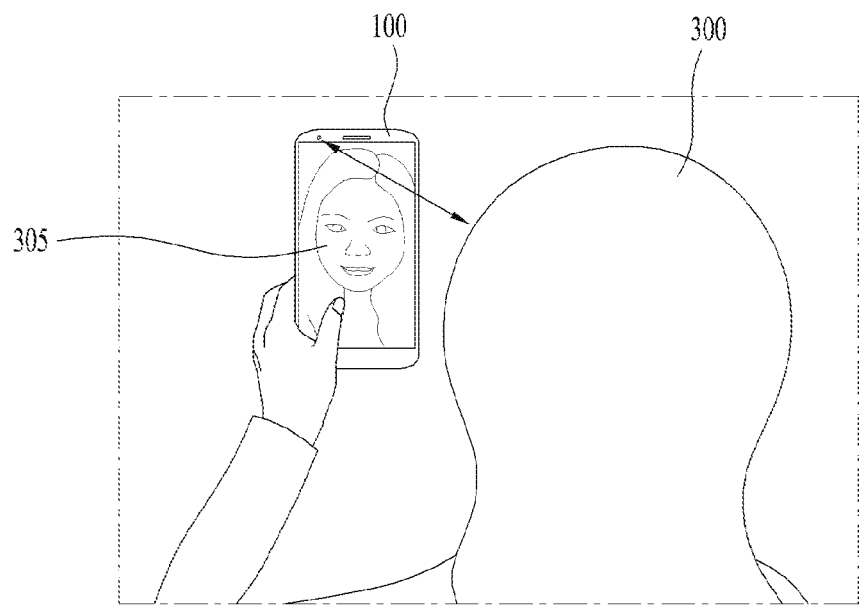
(a)
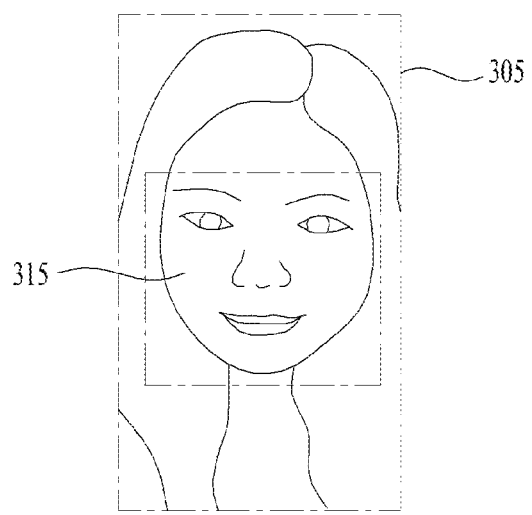
(b)

FIG. 4
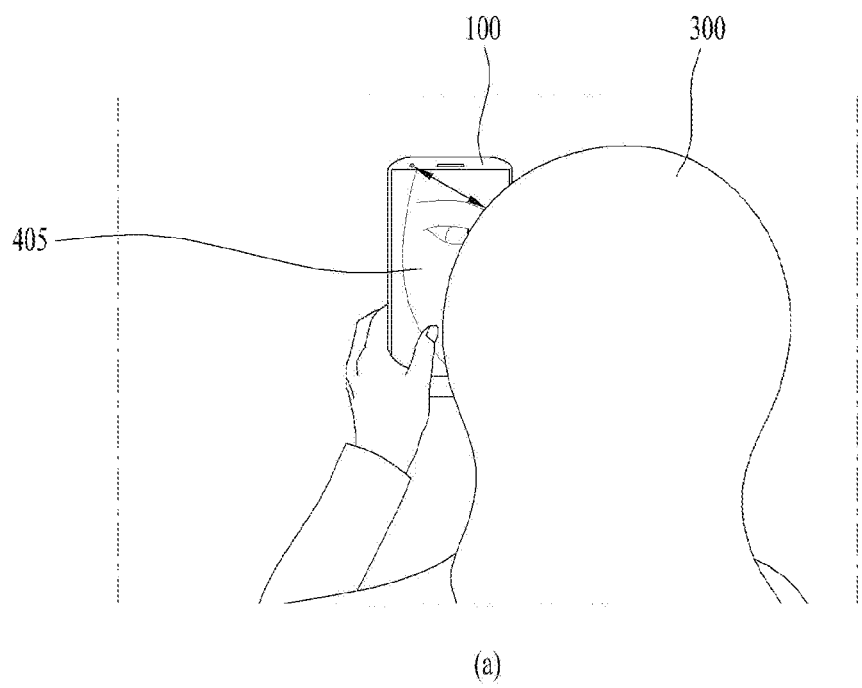
(a)
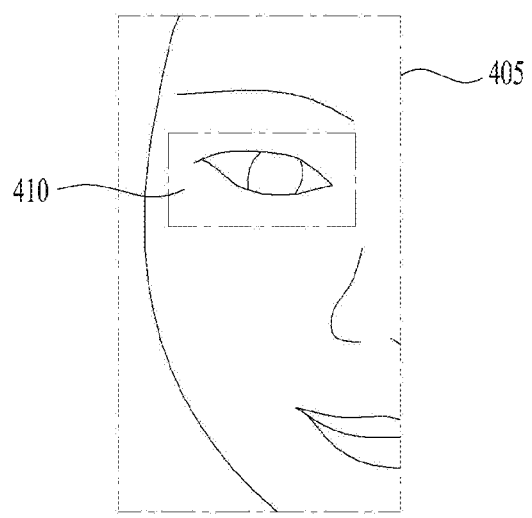
(b)

FIG. 5
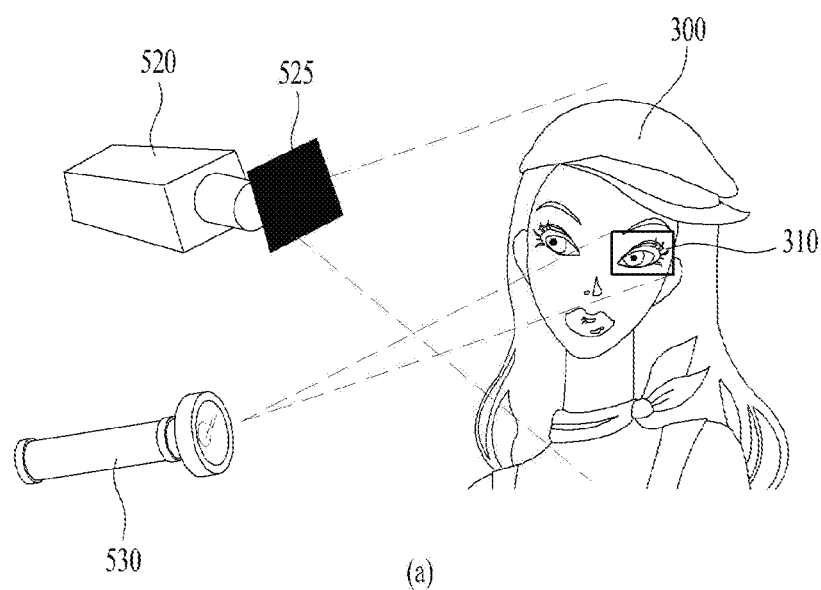
(a)
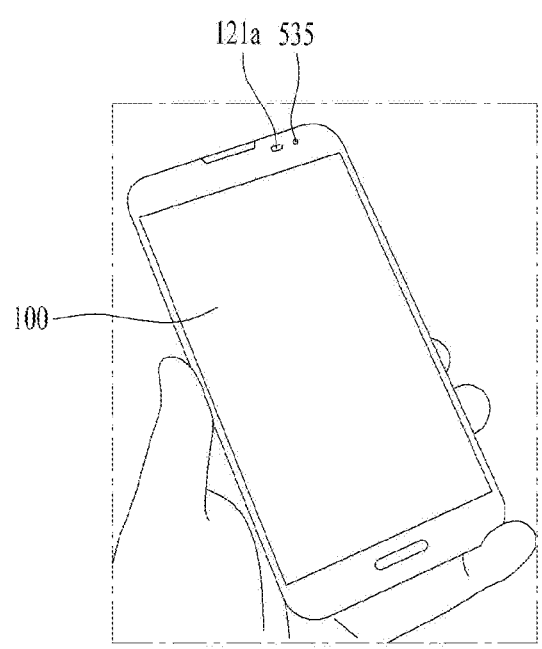
(b)

FIG. 15
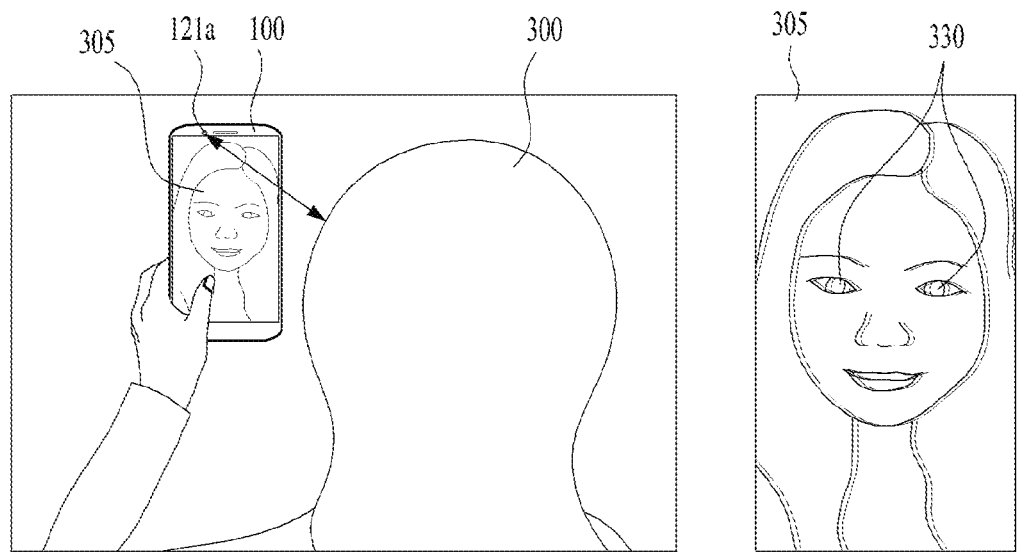
Unfocused image
(a)
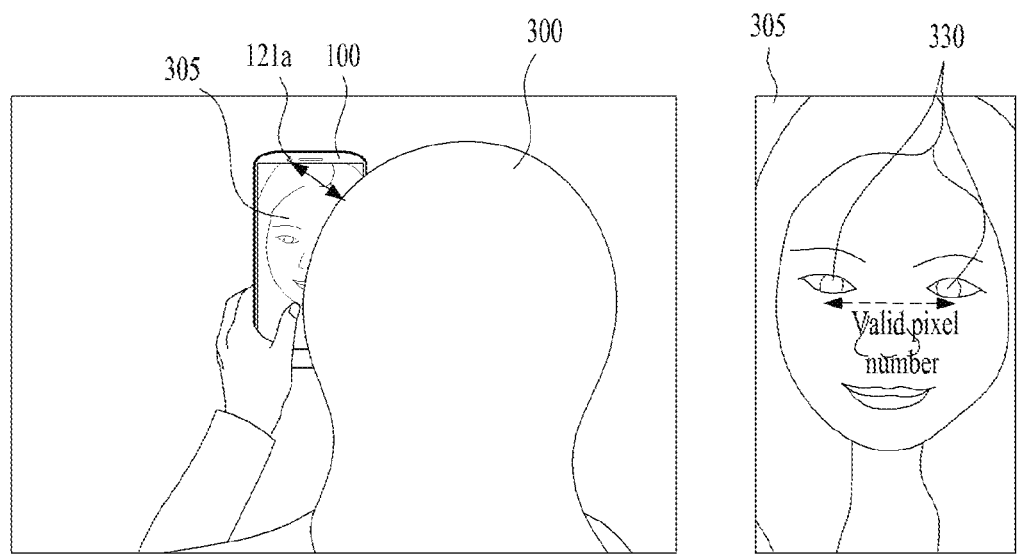
Focused image
(b)

FIG. 16
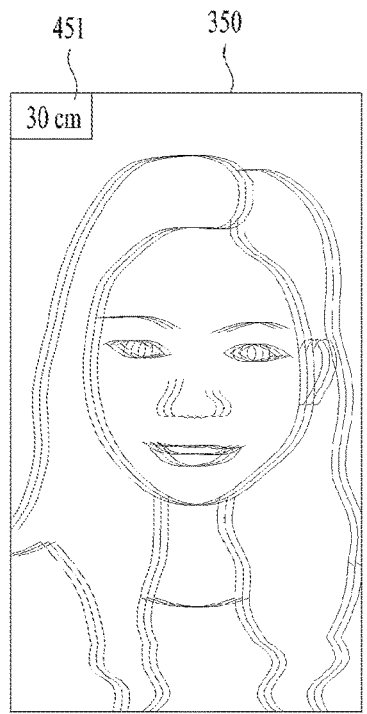
(a)
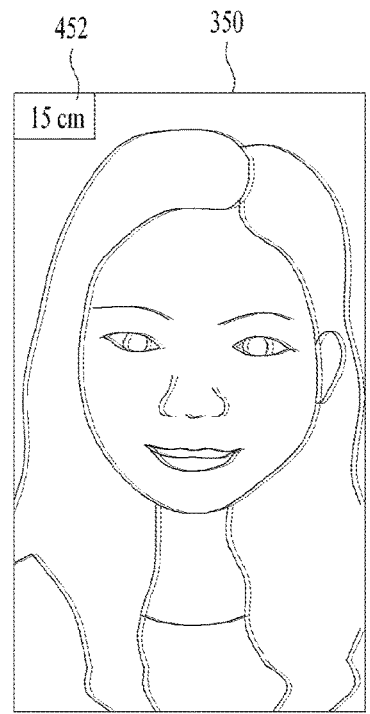
(b)
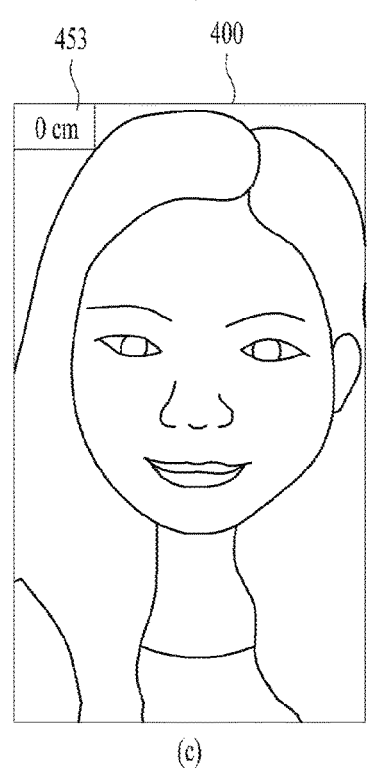
(c)

FIG. 18
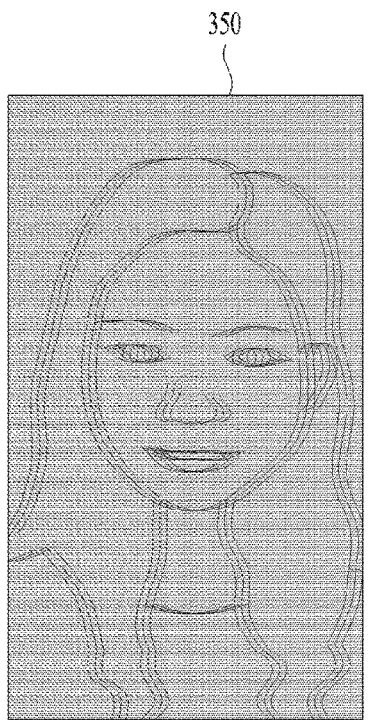
(a)
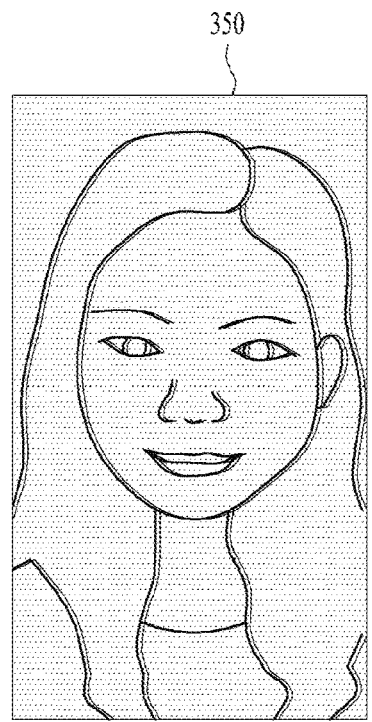
(b)
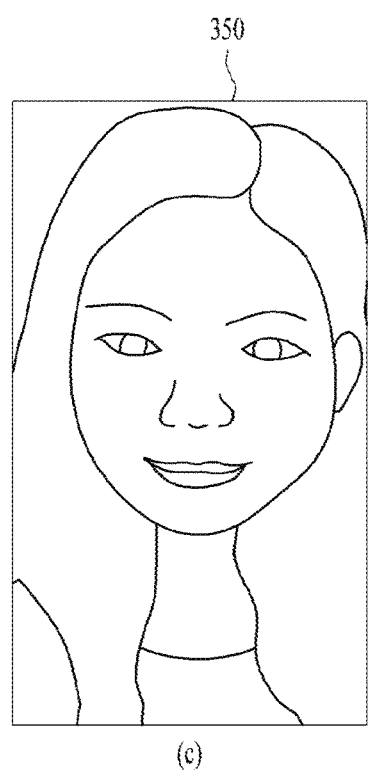
(c)

FIG. 19
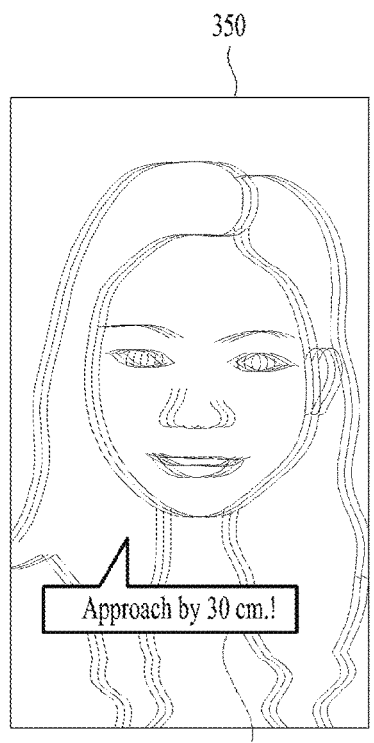
(a) 471
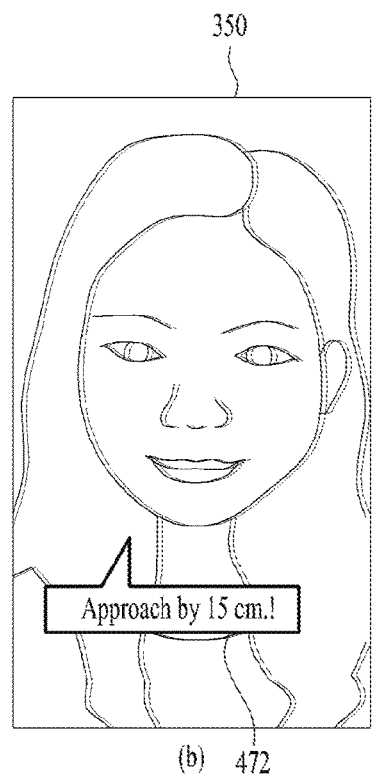
(b) 472
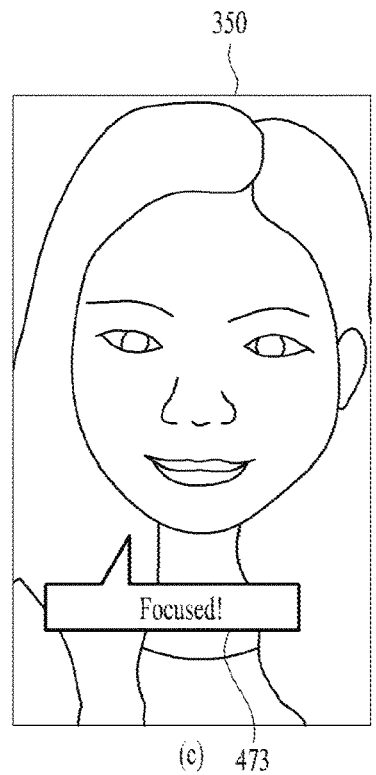
(c) 473

FIG. 21
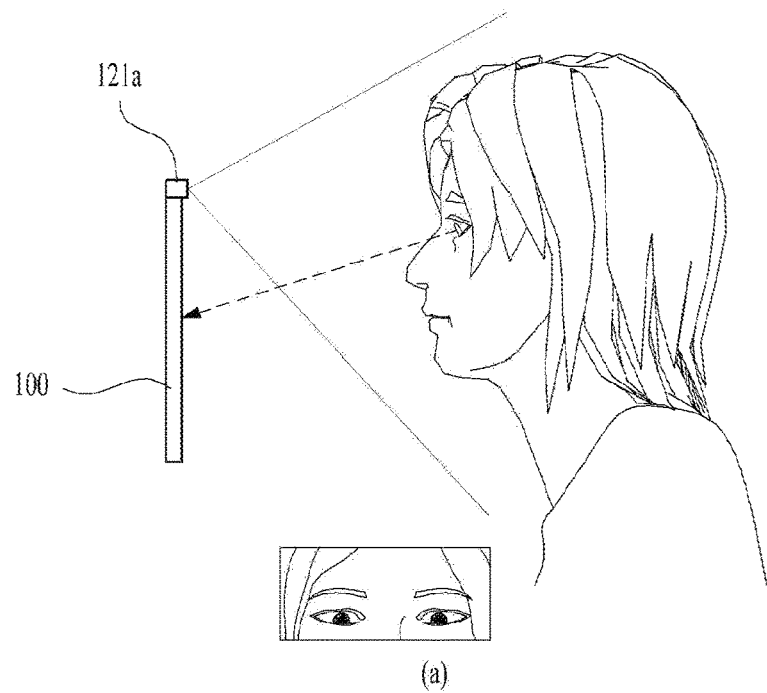
(a)
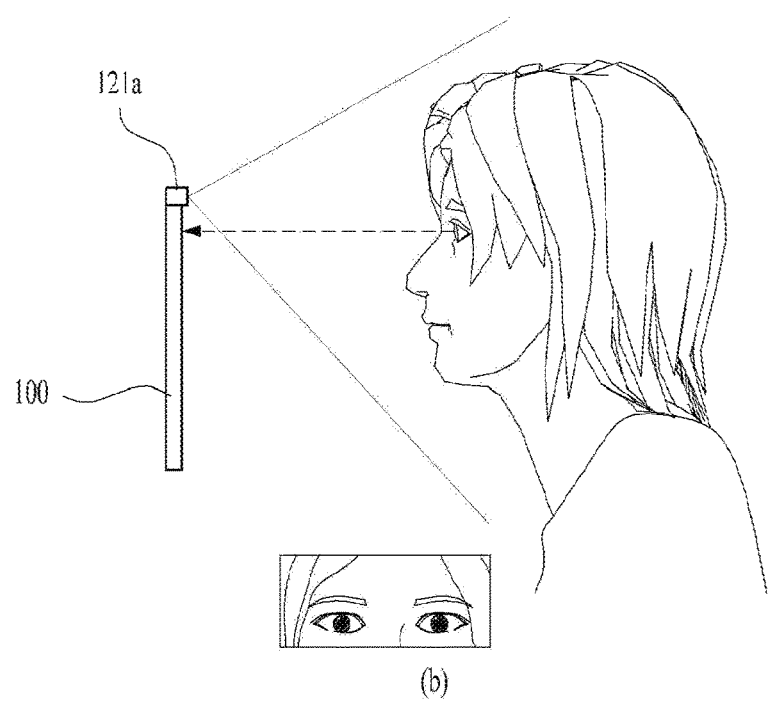
(b)

MOBILE TERMINAL AND METHOD FOR CONTROLLING SAME

CROSS-REFERENCE TO RELATED APPLICATIONS

This application is the National Stage filing under 35 U.S.C. 371 of International Application No. PCT/KR2015/001816, filed on Feb. 25, 2015, which claims the benefit of earlier filing date and right of priority to Korean Application Nos. 10-2014-0029485, filed on Mar. 13, 2014 and 10-2014-0138151, filed on Oct. 14, 2014, the contents of which are all hereby incorporated by reference herein in their entirety.

TECHNICAL FIELD

The present invention relates to a mobile terminal and controlling method thereof, suitable for performing user authentication through a camera.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

Particularly, as functions of a mobile terminal are getting diversified, authentication functions using user's personal information for product purchases, various credit payments, security required site accesses and the like are performed through the mobile terminal as well. Yet, in case of performing user authentication by inputting such personal information, a security problem such as leakage of user's personal information and the like may be caused. And, it may be also inconvenient to input passwords to various authentication certificates one by one.

To support and increase the mobile terminal functions, it may be able to consider the improvement of structural parts and/or software parts of the mobile terminal.

For the use convenience and the security safety, a user authentication system using user's unique body elements such as fingerprint, iris, face and the like is attempted on a mobile terminal. To this end, a recognition module for a user body element is added to a mobile terminal by hardware and software improvement is attempted to operate the added module.

However, although the user authentication system is applied, it may cause a problem that a recognition rate varies according to a user environment. Moreover, in case that a user body needs to approach a mobile terminal in a prescribed range in order to raise a recognition rate, a user may be reluctant due to personal inclination.

Moreover, regarding iris recognition, when an iris is captured for the iris recognition by a camera of a mobile terminal, it is inconvenient for a user to adjust a proper distance between the user and the camera by guessing a focus while watching a camera preview screen of the mobile terminal in order to obtain a focused iris image in a proper size.

DISCLOSURE OF THE INVENTION

Technical Task

One technical task of the present invention is to provide a mobile terminal and controlling method thereof, by which a different authentication scheme can be performed in accordance with a distance between a user authentication attempting user and the mobile terminal.

Another technical task of the present invention is to provide a mobile terminal and controlling method thereof, by which a user in focus can be guided to a proper distance between the user and a camera of the mobile terminal in the course of iris recognition.

Technical Solutions

In one technical aspect of the present invention, provided herein is a mobile terminal, including a camera, a display unit configured to display an image inputted via the camera, and a controller configured to perform user authentication based on a first face image when the first face image including face elements required for the user authentication via the camera is received and perform the user authentication using at least one face element included in a second face image when the second face image lacking the face elements partially is received.

The second face image may include a first face element. The mobile terminal according to one embodiment of the present invention may further include a memory storing a focal distance information of a second face element required for the user authentication. When a difference between a focal distance of the first face element in the second face image and a focal distance of the stored second face element is generated, the controller may perform an operation of guiding the focal distances of the first and second face elements to match each other.

In another technical aspect of the present invention, provided herein is a method of controlling a mobile terminal, including receiving a first face image including face elements required for user authentication via a camera, displaying the received first face image, performing the user authentication based on the received first face image, receiving a second face image lacking the face elements partially via the camera, displaying the received second face image, and performing the user authentication using at least one face element included in the received second face image.

Advantageous Effects

Effects of a mobile terminal and controlling method thereof according to the present invention are described as follows.

According to at least one of embodiments of the present invention, since a mobile terminal according to the present invention does not need to use a user's password for user authentication, there is no danger of personal information leakage and the user is relieved from the troubles in memorizing and inputting a password one by one.

According to at least one of embodiments of the present invention, since a different authentication scheme is executed in response to a distance for a user to perform user authentication through the mobile terminal, convenience in use is maximized. In particular, a user body element recognized in accordance with a distance between a mobile terminal and a user may be different. According to the present invention, a user authentication scheme can be executed in accordance with an authentication scheme corresponding to a user body element recognized by a mobile terminal. Therefore, in order to raise a recognition rate of a user body element, it is unnecessary for a user to approach a mobile terminal or set up a user authentication scheme separately in advance.

According to at least one of embodiments of the present invention, as a mobile terminal of the present invention is further provided with an infrared light-emitting unit so as to enable a user's iris to be recognized through an existing camera, it is able to save the cost incurred in case of providing a camera for iris recognition to the mobile terminal in addition.

According to at least one of embodiments of the present invention, when an iris recognition is performed, a mobile terminal of the present invention informs a user of a real-time difference between an optimal iris image and a focal distance of a current iris image and guides a user to enable the focal distance of the current iris image to match the focal distance of the optimal iris image.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

FIG. 3 is a diagram to describe a user authentication scheme using a user face applied to a mobile terminal according to an embodiment of the present invention.

FIG. 4 is a diagram to describe a user authentication scheme using a portion of a user face applied to a mobile terminal according to an embodiment of the present invention.

FIG. 5 is a diagram to describe an infrared light-emitting unit of a mobile terminal according to an embodiment of the present invention.

FIGS. 15 to 22 are diagrams to describe a process for guiding a proper distance between a focused user and a camera in case of iris recognition in a mobile terminal according to an embodiment of the present invention.

BEST MODE FOR INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
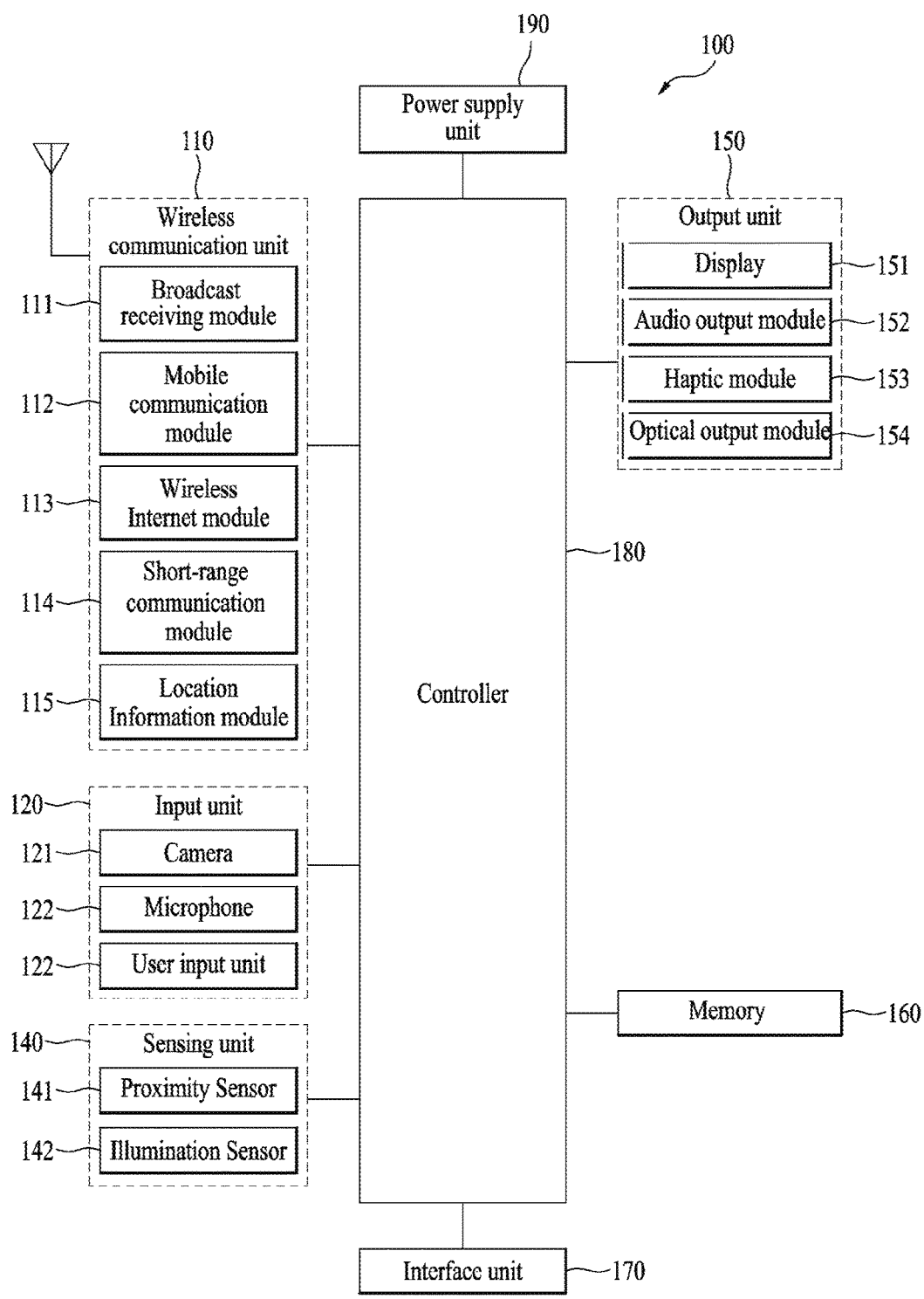
FIG. 1A is a block diagram to describe a mobile terminal related to the present invention.
Figure 1B:
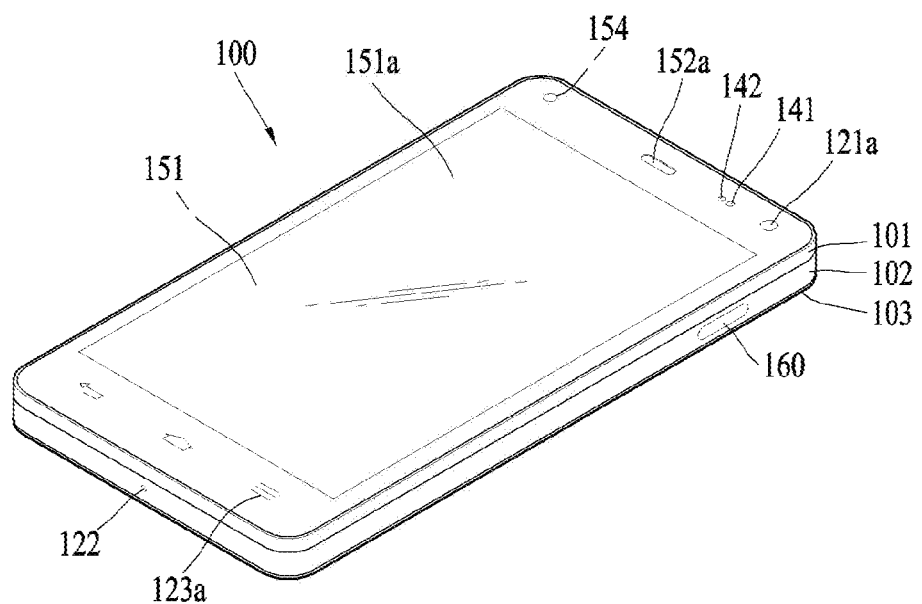
FIG. 1B and FIG. 1C are conceptual diagrams for one example of a mobile terminal related to the present invention in different views.
Figure 1C:
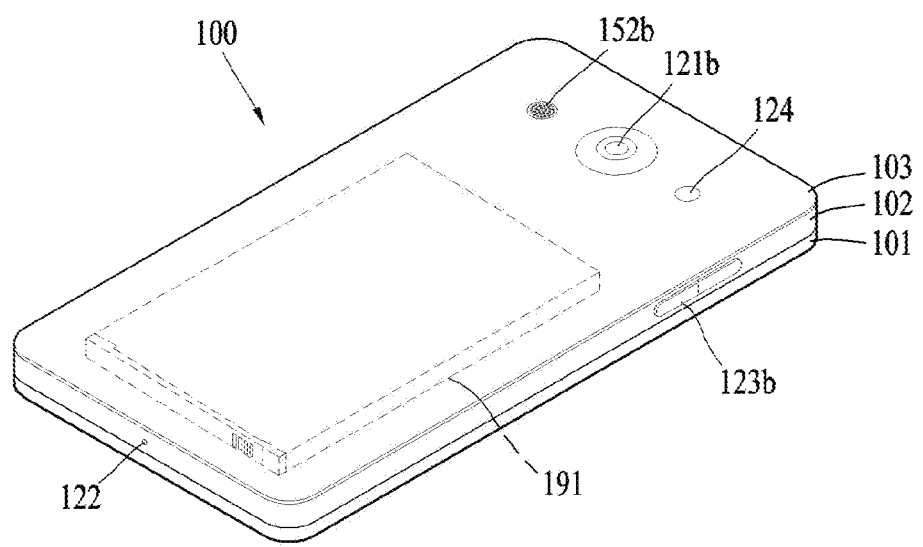

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

For instance, the wireless communication unit 110 typically includes one or more components which permit wireless communication between the mobile terminal 100 and a wireless communication system or network within which the mobile terminal is located.

The wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, and the like) for allowing a user to input information. Data (for example, audio, image, and the like) is obtained by the input unit 120 and may be analyzed and processed by controller 180 according to user commands thereof.

The sensing unit 140 is typically implemented using one or more sensors configured to sense internal information of the mobile terminal, the surrounding environment of the mobile terminal, user information, and the like. For example, in FIG. 1A, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170.

Moreover, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components can cooperatively operate to implement operations, controls and controlling methods of the mobile terminal according to various embodiments described in the following. The operations, controls or controlling methods of the mobile terminal can be implemented on the mobile terminal by running at least one application program saved to the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi) and Wi-Fi Direct, and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100).

The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114.

Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof.

In this case, the terminal body can be construed as the concept of indicating the mobile terminal 100 as at least one assembly.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal includes a display unit 151, a first and a second audio output modules 151a/151b, a proximity sensor 141, an illumination sensor 142, an optical output module 154, a first and a second cameras 121a/121b, a first and a second manipulation units 123a/123b, a microphone 122, interface unit 160 and the like.

It will be described for the mobile terminal as shown in FIGS. 1B and 1C. The display unit 151, the first audio output module 151a, the proximity sensor 141, an illumination sensor 142, the optical output module 154, the first camera 121a and the first manipulation unit 123a are arranged in front surface of the terminal body, the second manipulation unit 123b, the microphone 122 and interface unit 160 are arranged in side surface of the terminal body, and the second audio output modules 151b and the second camera 121b are arranged in rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. For example, the display unit 151 may display an execution screen information of an application operated in the mobile terminal or User Interface, Graphic User Interface corresponding to the execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

Moreover, the display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151 a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like.

In the present drawing, the first manipulation unit 123a is a touch key for example, by which the present invention is non-limited. For instance, the first manipulation unit 123 may include a push key (i.e., a mechanical key) or a combination of the touch key and the push key.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160.

The battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

In the following description, with reference to FIGS. 2 to 22, embodiments related to a controlling method implemented in a mobile terminal according to the present invention are described.

In the present specification, a first face image means a face image of a character inputted to the camera 121a of the mobile terminal 100, and more particularly, an image including overall face elements for face recognition in comparison with a second face image in the following. The first face image may include such face elements as a face contour, eyebrows, two eyes (or one eye) nose, mouth, etc. of a character. Moreover, the first face image may be an image including other elements such as ears, chin etc. of the character additionally.

Based on the first face image recognized through the camera 121a, the controller 180 can perform user authentication of the mobile terminal 100. In the following description, the user authentication performed on the basis of the first face image shall be named a first user authentication.

Namely, if the first face image of the character is inputted through the camera 121a, the controller 180 recognizes a face of the character in a manner of distinguishing it from a background and is able to determine whether the character corresponding to the face image is a user through face elements on the first face image. In doing so, the controller 180 can perform a first user authentication based on a preset face element according to user's settings or manufacturer's settings.

In particular, instead of using all the aforementioned face elements, the controller 180 can perform the first user authentication based on the preset face element. For instance, if the user sets factors for performing the first user authentication to two eyes, nose, and the like among the face elements on the first face image, the controller 180 can perform the first user authentication by recognizing shapes of the eyes, a distance between the eyes, a shape of the nose, a distance between the nose and each of the eyes and the like on the first face image. Yet, since the first user authentication is performed through face recognition, assume that a plurality of the preset face elements are used for the first user authentication.

Particularly, in order to improve a recognition rate and accuracy in the user authentication, in some cases, the user may set the entire face elements on the first face image as the factors for the first user authentication.

In the present specification, a second face image means an image lacking some of the face elements required for the first user authentication. Particularly, the second face image may be a partial image of a face inputted through the camera 121a and may include some of the face elements on the first face image. And, the second face image may be an image lacking some of face elements preset for the first user authentication.

In particular, as a plurality of preset face elements among the face elements included in the first face image are used for the first user authentication, if an inputted image lacks some of a plurality of the face elements, the controller 180 may recognize the inputted image as the second face image.

For instance, assume that two eyes, nose and mouth of the character are included as the face elements on the first face image and that the face elements preset as the factors for the first user authentication are two eyes and nose. In this case, if a distance between the user's face and the camera 121a of the mobile terminal 100 is short, a partial image of the first face image can be inputted through the camera 121a.

In doing so, particularly, the inputted partial image may be an image resulting from excluding mouth and one eye from the face elements on the first face image. Namely, as the face elements for the first user authentication are two eyes and nose, a face image including one eye lacking some of the face element of the two eyes and the nose may become the second face image of the present invention. Alternatively, a face image including the two eyes or one eye except the nose in the above example may become the second image of the present invention. Alternatively, an image including the nose only except two eyes in the above example may become the second face image of the present invention.

If such a second face image is inputted, the controller 180 can perform a second user authentication using at least one of the face elements derivable from the second face image. In particular, in the above example, if the one eye and nose of the face elements are included in the second face image, the controller 180 can perform the user authentication using at least one of the one eye and the nose.

In case that the controller 180 performs the user authentication using one eye only, the controller 180 may perform the user authentication by recognizing an iris of the one eye or irises of the two eyes. In particular, the controller 180 recognizes the iris as the face element on the inputted image and is then able to perform the user authentication by comparing the recognized iris to a saved iris pattern. Thus, the user authentication performed by the controller 180 using the second face image shall be named a second user authentication in the following description.

As mentioned in the above description, if the second face image inputted through the camera 121a lacks some of the face elements for the first user authentication, it is able to determine whether to perform the user authentication using the rest of the face elements on the second face image except the lacked elements among the face elements for the first user authentication or using specific face element(s) only according to user's or manufacturer's settings.

In case of performing the user authentication using the specific face element only, whether to perform the user authentication by specifying a prescribed one of the recognized face elements or using a prescribed face element preferentially can be determined according to user's or manufacturer's settings as well.

Meanwhile, described is the case that the second face image is the image lacking some of the face elements for the first user authentication. Yet, in some cases, an image lacking the entire face elements for the first user authentication can become the second dace image.

In the above example, in case that the face image inputted through the camera 121a includes user's mouth as the face element only, the second face image is the image including the mouth among the face elements. And, the controller 180 may perform the second user authentication using the face element 'mouth'.

The present invention is described in detail with reference to FIGS. 2 to 22 as follows.

Figure 2:
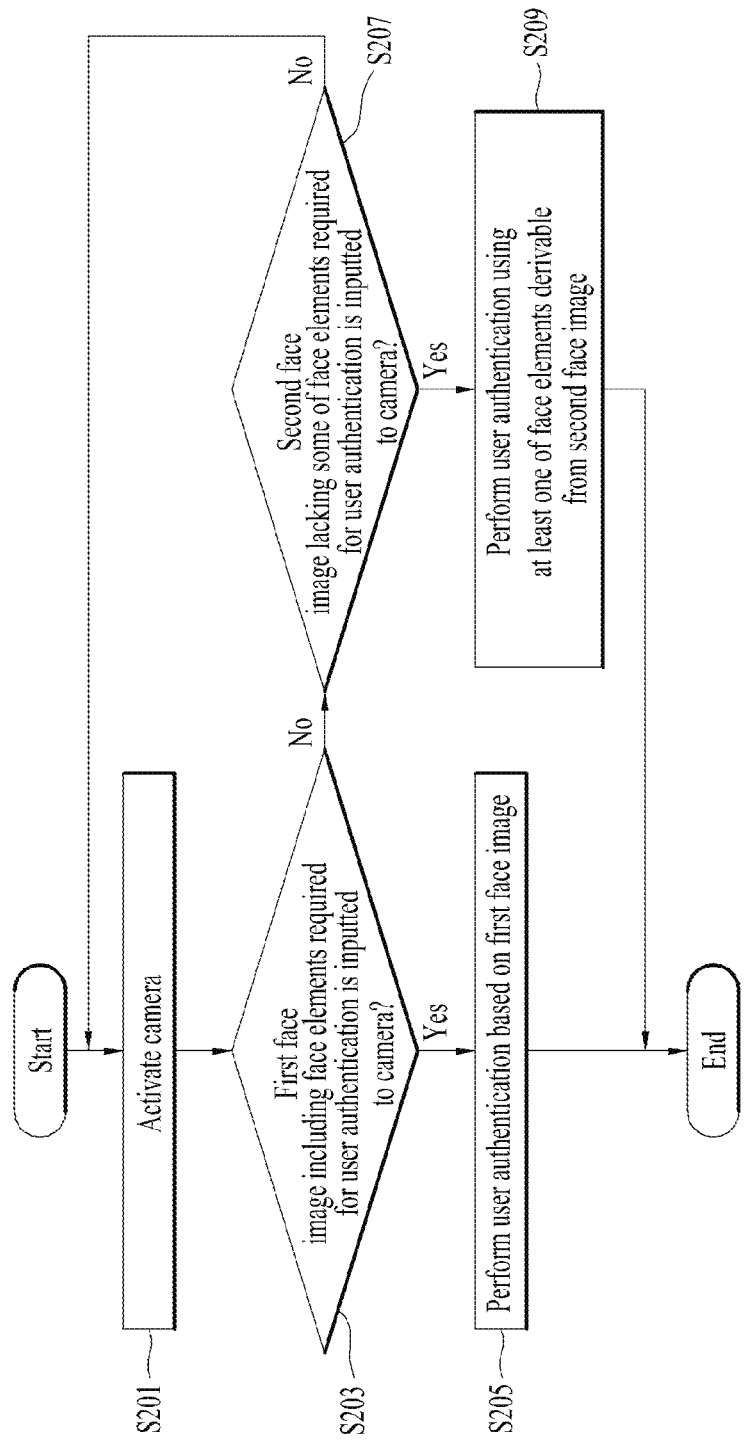
FIG. 2 is a flowchart for an operation of a mobile terminal according to an embodiment of the present invention.

FIG. 2 is a flowchart for an operation of a mobile terminal according to an embodiment of the present invention. FIG. 3 is a diagram to describe a user authentication scheme using a user face applied to a mobile terminal according to an embodiment of the present invention. FIG. 4 is a diagram to describe a user authentication scheme using a portion of a user face applied to a mobile terminal according to an embodiment of the present invention.

Referring to FIG. 2, the controller 180 can control the camera 121a to be activated for user authentication [S201]. For the user authentication, examples for the controller 180 to activate the camera 121a shall be described later with reference to FIG. 10 and FIG. 11.

FIG. 3 (a) shows a case that a user 300 grips the mobile terminal 100 in a prescribed distance. If a user's face image is inputted through the camera 121a activated in the prescribed distance, the controller 180 can determine whether the inputted face image corresponds to a first face image in a manner of distinguishing the inputted face image from a background image [S203].

Namely, the controller 180 can recognize face element on the face image inputted through the camera 121a and is able to determine whether the inputted face image includes the face element for a first user authentication. In doing so, the controller 180 can control the inputted first face image 305 to be displayed through the display unit 151.

Referring to FIG. 3 (b), the controller 180 can perform the first user authentication based on the first face image 305 [S205].

In particular, the controller 180 extracts a preset face element as a factor for the first user authentication from the face elements on the first face image 305 and is then able to determine whether the extracted factor corresponds to a user's pre-registered face element. The controller 180 can determine a region 315 including the preset face element for the first user authentication and may control a focus of the camera 121a to be adjusted centering on the region 315. By the focus adjustment, it is able to raise a recognition rate in performing the user recognition of the controller 180 for the user authentication.

For instance, if two eyes, nose and mouth are set as the face element for the first user authentication, the controller 180 confirms the region 315 containing the two eyes, nose and mouth all and is able to recognize a shape, location and inter-face element distance of each of the face elements on the region 315. Based on the recognition result, the controller 180 can determine whether the inputted first face image corresponds to the pre-registered user face element.

As a result of the determination, if the extracted factor corresponds to the pre-registered user face element, the controller 180 can control the first user authentication to be performed. In case that the first user authentication is completed, the launch of the function of the mobile terminal 100 by the controller 180 and the launch of various applications performed through the mobile terminal 100 by the controller 180 shall be described with reference to FIG. 12 and FIG. 13 later.

Meanwhile, in the step S203, a case that the inputted face image is not the first face image is described as follows.

FIG. 4 (a) shows a case that a user 300 grips the mobile terminal 100 in a prescribed distance. Particularly, in FIG. 4 (a), a distance between the mobile terminal 100 and the user is shorter than that shown in FIG. 3 (a).

In this case, through the activated camera 121a, a second face image different from the first face image shown in FIG. 3 (b) can be inputted. Namely, if the distance between the mobile terminal 100 and the user 300 is short, a second image lacking some of face elements required for the first user authentication can be inputted through the camera 121a.

The controller 180 can determine whether the inputted image corresponds to the second face image [407]. Namely, the controller 180 can recognize the face element on the face image inputted through the camera 121a and is also able to recognize that the inputted face image lacks some of the face elements for the first user authentication.

For instance, among the face elements on the first face image 305 like the example shown in FIG. 3, assume that the preset face elements for the first user authentication are two eyes, nose and mouth. If a face 405 of the user 300 is inputted, the controller 180 can recognize that the second face image 405 failing to include one of the two eyes corresponding to the face element is inputted.

In doing so, the controller 180 may control the inputted second face image 405 to be displayed through the display unit 151.

Referring to FIG. 4 (b), based on the second face image 405, the controller 180 can perform a second user authentication [S209]. Particularly, in the above example, as the second face image 405 from which one of the two eyes is excluded is inputted, the controller 180 can recognize that the first user authentication is impossible. Hence, using at least one of the face elements derivable from the inputted second face image 405, the controller 180 can perform a second user authentication.

A case that an iris of the user among the face elements derivable from the second face image 405 is preset as the face element for the second user authentication shall be taken as one example for the following description. The controller 180 can determine a region 410 in which the preset face element for the second user authentication is included and is able to control a focus of the camera 121a to be adjusted centering on the region 410. Using the camera 121a, the controller 180 recognizes a user iris and is able to determine whether the recognized iris corresponds to a user's pre-registered iris pattern.

As a result of the determination, if the recognized iris corresponds to the user's pre-registered iris pattern, the controller 180 can control the second user authentication to be performed. In case that the second user authentication is completed, the launch of the function of the mobile terminal 100 by the controller 180 and the launch of various applications performed through the mobile terminal 100 by the controller 180 shall be described with reference to FIG. 12 and FIG. 13 later.

On the other hand, when the second face image 405 is not inputted, if a user input or a request for user authentication is detected, the controller 180 can control the camera 121a to be activated.

A camera operation for iris recognition shall be described in detail with reference to FIGS. 5 to 7 as follows.

FIG. 5 is a diagram to describe an infrared light-emitting unit of a mobile terminal according to an embodiment of the present invention. FIG. 6 is a diagram to describe wavelength of light recognized by a camera of a mobile terminal according to an embodiment of the present invention. FIG. 7 is a diagram to describe an infrared pass filter provided to a camera of a mobile terminal according to an embodiment of the present invention.

FIG. 5 (a) is a diagram for one example to describe configuration of equipments for recognizing an iris 310 of a user 300. FIG. 5 (a) shows that the equipments for the recognition of the iris 310 include a camera 520, an infrared (IR) pass filter 525 and an IR light source 530.

If the iris 310 is exposed to the IR light source and visible rays are removed, a recognition rate of the recognition of the iris 310 is increased. Hence, when the iris 310 is exposed to the IR light source 530, while the visible rays are removed through the IR pass filter 525, the camera 520 recognizes a pattern of the iris 310 in general. Particularly, since the IR pass filter 525 is physically coupled with the camera 520, a separate camera 520 may be further required for the iris recognition as well as the camera 121a provided to the front side of the mobile terminal 100 configured to allow visible rays to pass through.

Yet, with reference to FIG. 5 (b), proposed is the mobile terminal 100 enabling the iris recognition using the camera 121a configured to allow visible rays to pass through.

Referring to FIG. 5 (b), the mobile terminal 100 according to the present invention can include an IR light emitting unit 535 adjacent to the camera 121a. In case that an iris recognition scheme is used as a user authentication scheme, the controller 180 can control IR rays to be discharged through the IR light emitting unit 535. If the IR rays are discharged through the IR light emitting unit 535, the controller 180 can control the user's iris to be recognized through the camera 121a.

Meanwhile, in general, the camera 121a can be provided with a filter configured to allow a visible ray region 600 to pass through and cut off an IR region 610. Moreover, in case of the iris recognition camera 520 and the IR pass filter 525 shown in FIG. 5 (a), the IR ray region 610 passes through but the visible ray region 600 is cut off.

Figure 7:
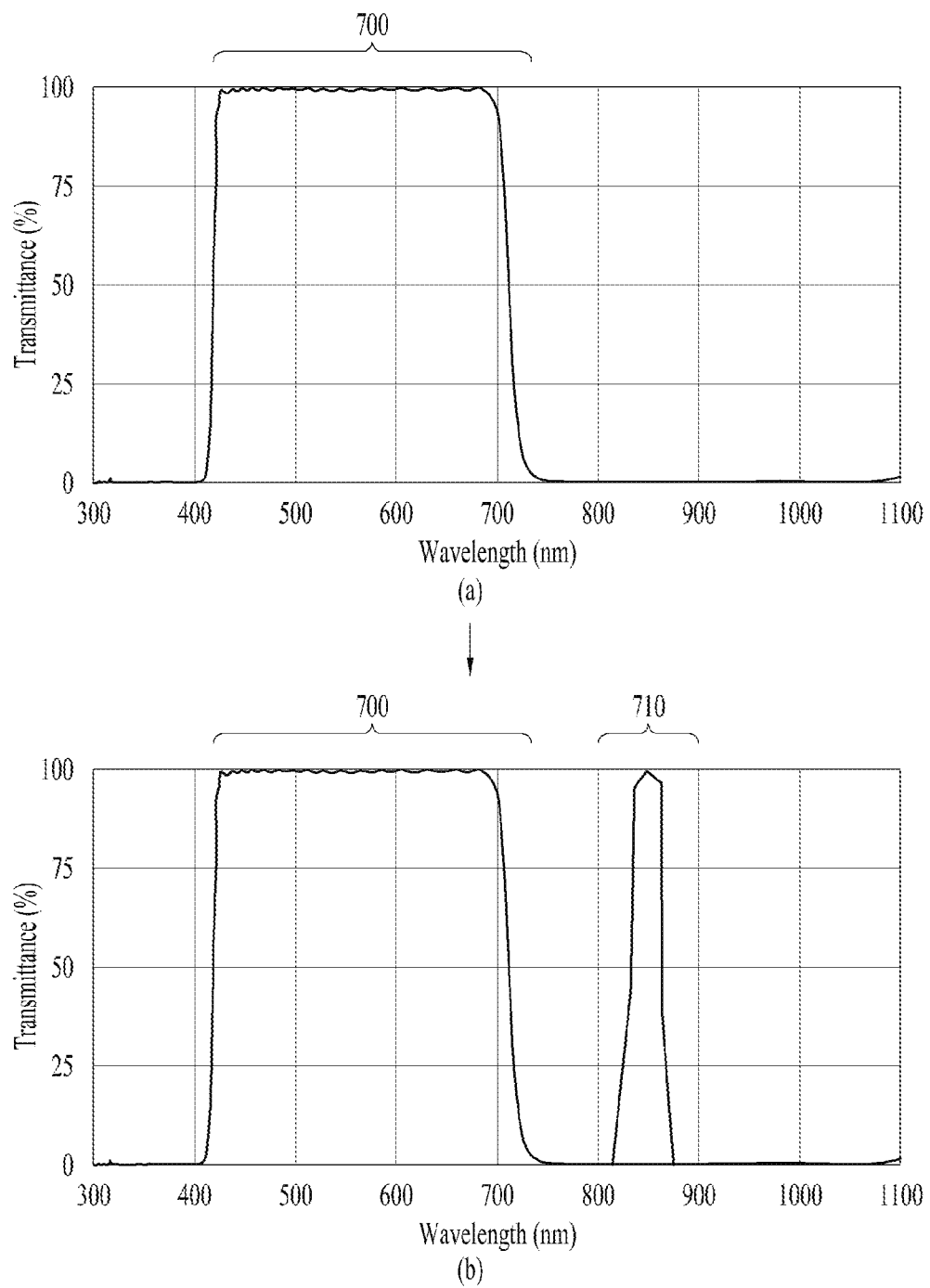
FIG. 7 is a diagram to describe an infrared pass filter provided to a camera of a mobile terminal according to an embodiment of the present invention.

FIG. 7 (a) shows one example of a normal filter of the camera 121a.

Figure 6:
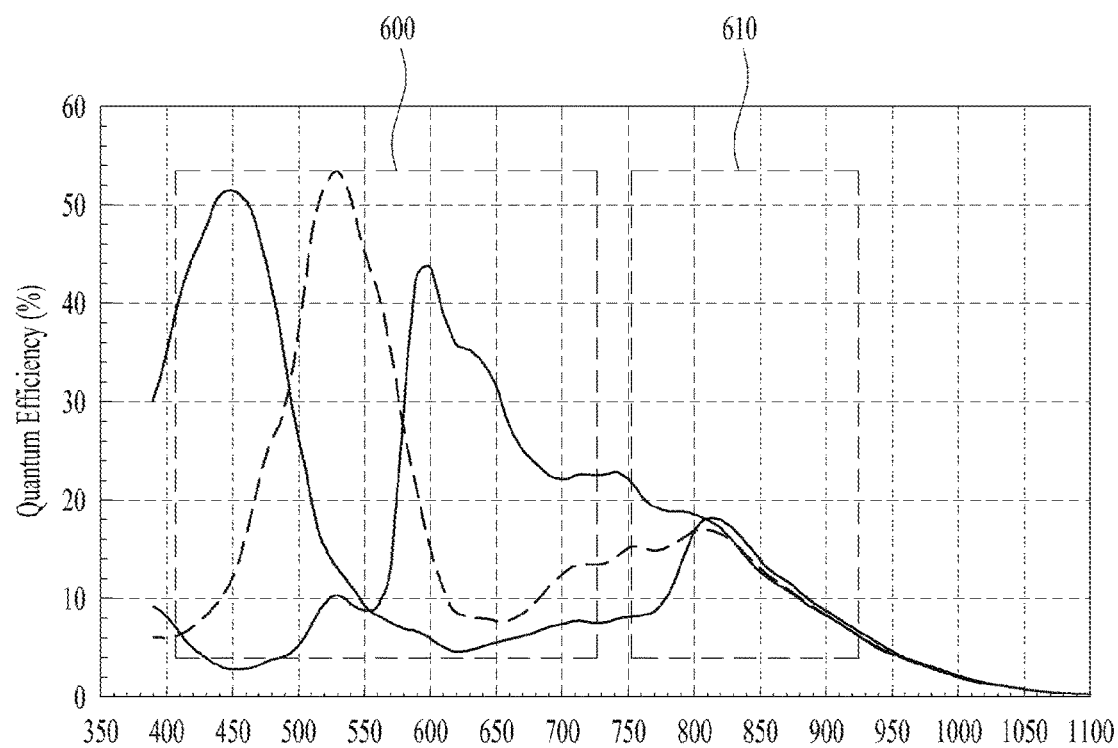
FIG. 6 is a diagram to describe wavelength of light recognized by a camera of a mobile terminal according to an embodiment of the present invention.

A region 700 corresponds to a region for receiving light of the visible ray region 600 shown in FIG. 6. Yet, the camera 121a of the camera 121a can be provided with a filter improved to allow light to pass through the IR (infrared) region 610 shown in FIG. 6 via the region 710 shown as one example in FIG. 7 (b). Using the improved filter, the camera 121a can additionally sense IR light as well as visible light.

When such an improved filter is provided, if IR light is discharged through the IR light emitting unit 535, the discharged IR light is reflected by an iris. As the reflected IR light passes through the region 710 of the filter of the camera 121a, the controller 180 can recognize the user's iris.

Figure 8:
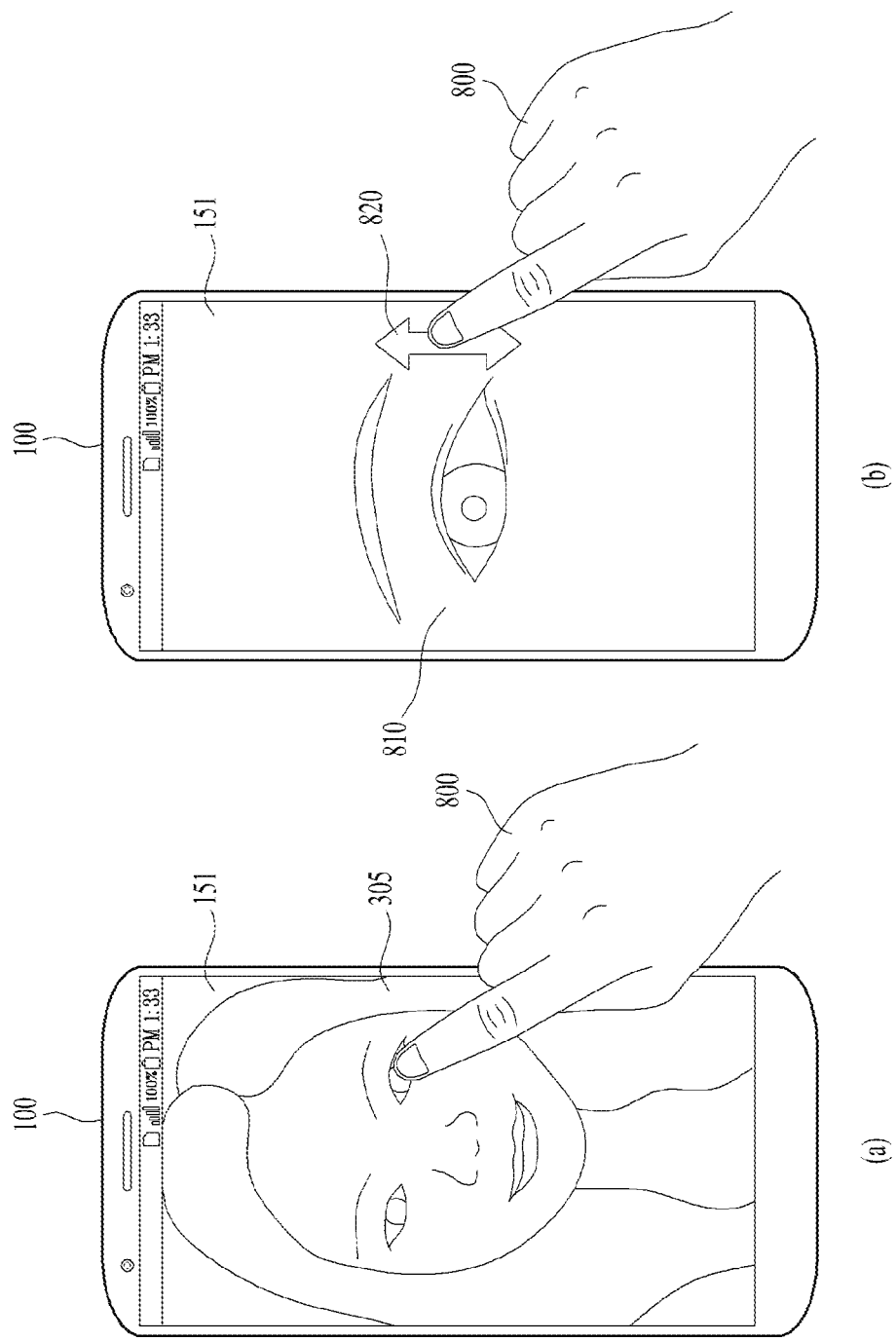
FIG. 8 is a diagram to describe a user authentication scheme using a portion selected from a user, which is applied to a mobile terminal according to an embodiment of the present invention.

As mentioned in the foregoing description with reference to FIG. 8, when a user performs a user authentication procedure through iris recognition, the user is located in a distance close to the camera 121a of the mobile terminal 100. Hence, in case of using the mobile terminal 100 having the improved filter applied camera 121a, it is able to raise the precision of the iris recognition despite that the camera 121a allows visible light to pass through the region 700. In particular, while the user and the camera 121a are located close to each other, if the controller 180 controls IR light to be discharged through the IR light emitting unit 535 in a manner of being adjacent to user's iris, it is able to minimize the influence of the visible light in the iris recognition.

Meanwhile, since the camera 121a allows visible light to pass through, it is still possible to photograph a subject exposed to visible light.

Figure 9:
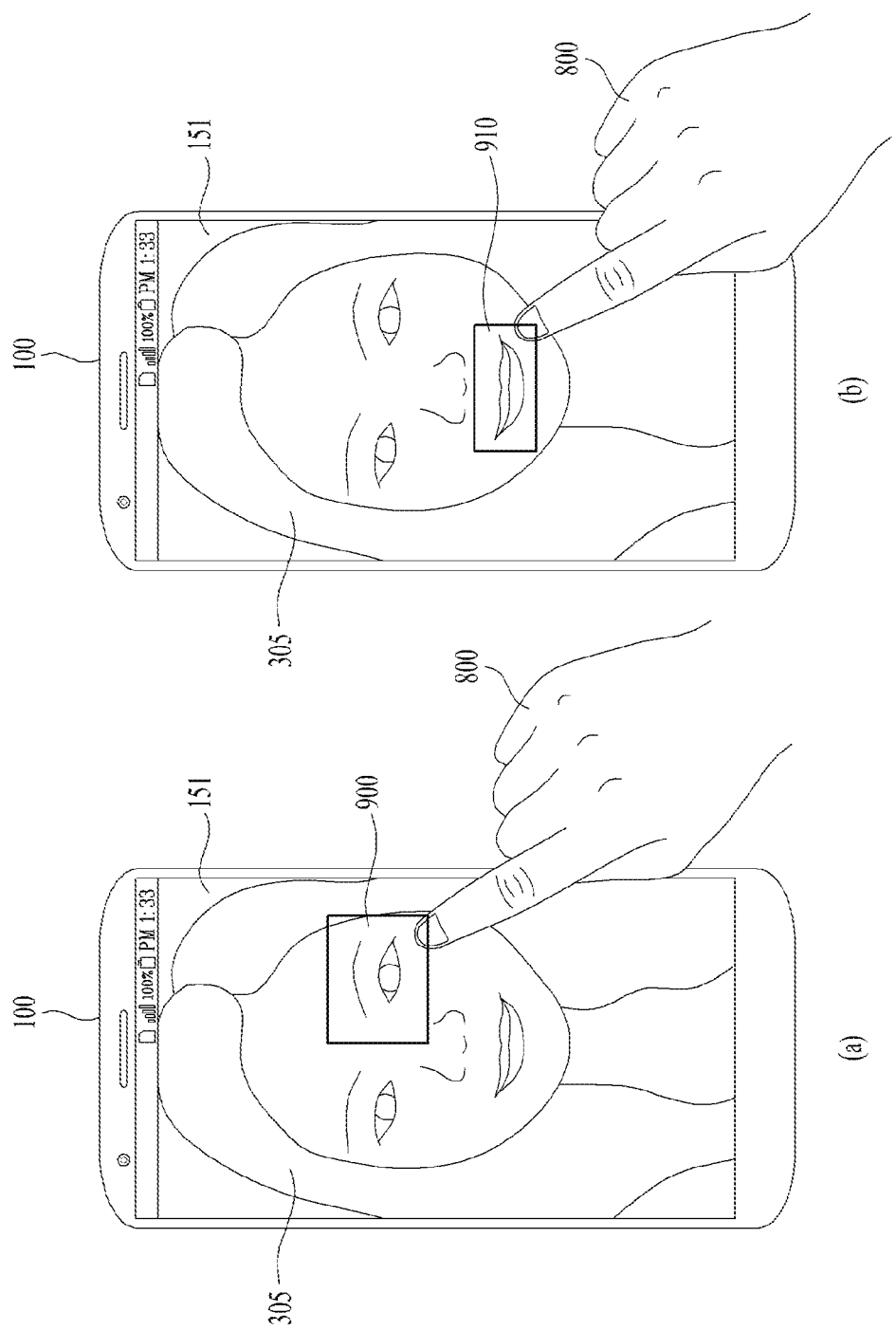
FIG. 9 is a diagram to describe a case of using a portion of a user face selected from a user for user authentication according to an embodiment of the present invention.

FIG. 8 is a diagram to describe a user authentication scheme using a portion selected from a user, which is applied to a mobile terminal according to an embodiment of the present invention. FIG. 9 is a diagram to describe a case of using a portion of a user face selected from a user for user authentication according to an embodiment of the present invention.

As mentioned in the foregoing description with reference to FIG. 3, if the first face image 305 is inputted through the camera 121a, the controller 180 can control the first face image 305 to be displayed through the display unit 151. FIG. 5 shows the case that if the first face image is inputted, the controller 180 performs the first user authentication. Yet, although the first face image is inputted, the controller 180 may not perform the first user authentication in some cases.

According to user's or manufacturer's settings, the controller 180 may control a notification window, which informs a user that a user authentication procedure according to a first face image input is in progress, to be displayed. Moreover, the controller 180 may control a user interface, which enables the user to determine whether to progress the first user authentication procedure, to be provided by the notification window. Through the user interface, although he first face image is inputted, the user may not perform the first user authentication through the mobile terminal 100.

Alternatively, after the first face image has been inputted, the controller 180 may control a selection window, which enables a user to select at least one of a first user authentication and a second user authentication as a user authentication scheme, to be displayed.

For instance, the selection window may include a first menu for enabling the controller 180 to perform the first user authentication, a second menu for enabling the controller 180 to perform the second user authentication, and a third menu for enabling the controller 180 to perform both of the first and second user authentications. If the third menu is selected by the user, after the first user authentication has been completed, the controller 180 can perform the first user authentication.

In this case, if the second or third menu is selected by the user, although the first face image has been inputted, the controller 180 may not perform the first user authentication.

Thus, if the first user authentication is not performed, it is able to select at least one of face elements derived from the first face image 505. Based on the selected face element, the controller 180 may perform the second user authentication. FIG. 8 (a) shows one example of a case that an iris is selected from the face elements on the first face image 305 by a user's touch gesture 800.

In this case, as mentioned in the foregoing description with reference to FIG. 4, the controller 180 can handle the selected iris as a face element, which is preset in case that a second face image is inputted, on the second face image for the second user authentication. In particular, when the first face image is inputted to the camera 121a and two eyes, nose and mouth on the first face image are preset as face elements for the first user authentication, if a specific face element is selected by the user, the controller 180 can handle that an image lacking other face elements except the selected face element (e.g., iris) has been inputted. Hence, the controller 180 can perform the second user authentication described with reference to FIG. 4.

The user's touch gesture 800 of selecting the face element may include one of various types such as a touch input, a tap input, a pinch-out input and the like. Moreover, a drag input of setting a specific face element included region can be included in the touch gesture 800 as well.

Particularly, FIG. 9 (a) shows one example of a case that a region 900 including eyebrow and eye among face elements on a first face image 305 is set by the drag input 800. And, FIG. 9 (b) shows one example of a case that a region 910 including mouth among the face elements on the first face image 305 is set by a drag input 900. The controller 180 can perform a second user authentication based on the face element(s) included in the region 900/910 set by the user's drag input 800 shown in FIG. 9 (a)/FIG. 9 (b).

Referring to FIG. 8 (b), for user confirmation on the selected face element, the controller 180 may control the selected face element 810 to be displayed by being enlarged. And, the controller 180 may control the camera 121a to be focused on the selected face element 810. If the user touch gesture 800 is inputted, the controller 180 can control a focus of the camera 121*a* to be adjusted. And, FIG. 8 (*b*) shows one example that the touch gesture 800 includes a drag input 820 in top/bottom direction.

The embodiment described with reference to FIG. 8 can apply to a case as follows. First of all, after the first face image 305 has been inputted, although the controller 180 attempts the user authentication, the controller 180 fails in the first user authentication.

And, such an embodiment can apply to a case as follows. First of all, although the first face image 305 is inputted, the first menu shown in the example is not selected by the user. Namely, although the first face image is inputted, such an embodiment can apply to a case that the controller 180 performs the second user authentication in response to a user input. Moreover, such an embodiment can apply to a case that a user authentication scheme, which is set at the mobile terminal or selected by the user, requires both of the first user authentication and the second user authentication.

Figure 10:
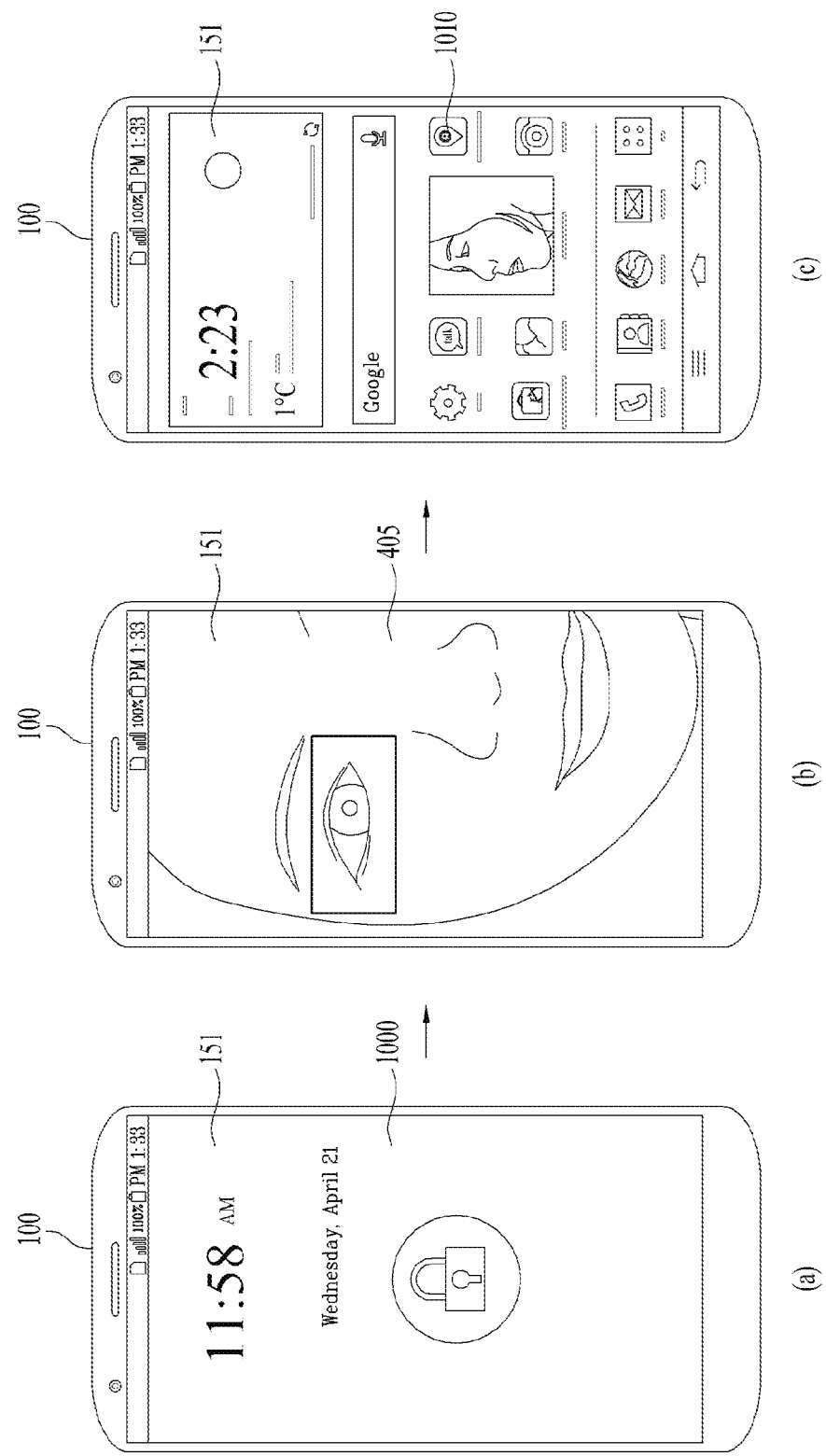
FIG. 10 is a diagram to describe a case of releasing a touchscreen unlocked state of a mobile terminal using a user authentication scheme according to an embodiment of the present invention.

FIG. 10 is a diagram to describe a case of releasing a touchscreen unlocked state of a mobile terminal using a user authentication scheme according to an embodiment of the present invention.

In this case, a locked state of the display unit 151 means a state that a touch gesture is not inputted or a state that a prescribed preset touch gesture is limitedly inputted, in order to prevent a mal-operation or a mal-touch from being applied to the display unit 151.

When the display unit 151 is in the locked state, the controller 180 can control the locked state to be released through the aforementioned first or second user authentication. To this end, in order to receive an input of a first or second face image, the controller 180 can control the camera 121*a* to be activated. The activation of the camera 121*a* may be performed in case of receiving a specific key input from a user or receiving a touch gesture applied to the display unit 151. As a movement of the mobile terminal 100 is sensed through the sensing unit 140, the controller 180 can control the camera 121*a* to be activated. For instance, if a user moves the mobile terminal 100 toward user's face for a first or second face image input, the controller 180 senses the corresponding movement through the sensing unit 140 and is able to control the camera 121 to be activated. In doing so, the controller 180 may control a graphic interface for the user authentication to be displayed through the display unit 151.

An unlock of the display unit 151 may mean a state that if a touch gesture is inputted onto the touchscreen 151, the controller 180 can execute a command corresponding to the inputted touch gesture. If the locked state of the display unit 151 is released through the first or second user authentication, the controller 180 can control at least one, which is selected from a home screen having at least one page displayed on the touchscreen 151, a menu screen having various app icons displayed thereon and a running screen of a specific application, to be displayed as an unlock screen. Before the display unit 151 is locked, if there exists an information currently displayed, the controller 180 can control the information, which is currently displayed before the display unit 151 is locked, to be displayed after the unlock.

Referring to FIG. 10 (*a*), if the display unit 151 is in locked state 1000, the controller 180 can control a graphic, which indicates the locked state, to be displayed.

If sensing a user input or a movement of the mobile terminal 100 for the activation of the camera 121*a*, the controller 180 can control the camera 121*a* to be activated.

While the display unit 151 is in the locked state, if a valid user is confirmed through a first or second user authentication, the controller 180 can control the display unit 151 to be unlocked.

FIG. 10 (*b*) shows one example of a case that a second face image 405 is inputted through the activated camera 121 and that a second user authentication is performed based on an iris among face elements.

Referring to FIG. 10 (*c*), through the second user authentication, the controller 180 can control the locked state of the display unit 151 to be released. FIG. 10 (*c*) shows a home screen 1010 as one example of an unlock screen. In the unlocked state of the display unit 151, the controller 180 can receive a touch gesture, which is applied to manipulate the mobile terminal 100, from a user.

The inputted face image, the face element used for the user authentication and the authentication scheme, which are mentioned in the above description, correspond to examples only. Alternatively, the controller 180 may use the first user authentication that uses face recognition according to an inputted face image.

Figure 11:
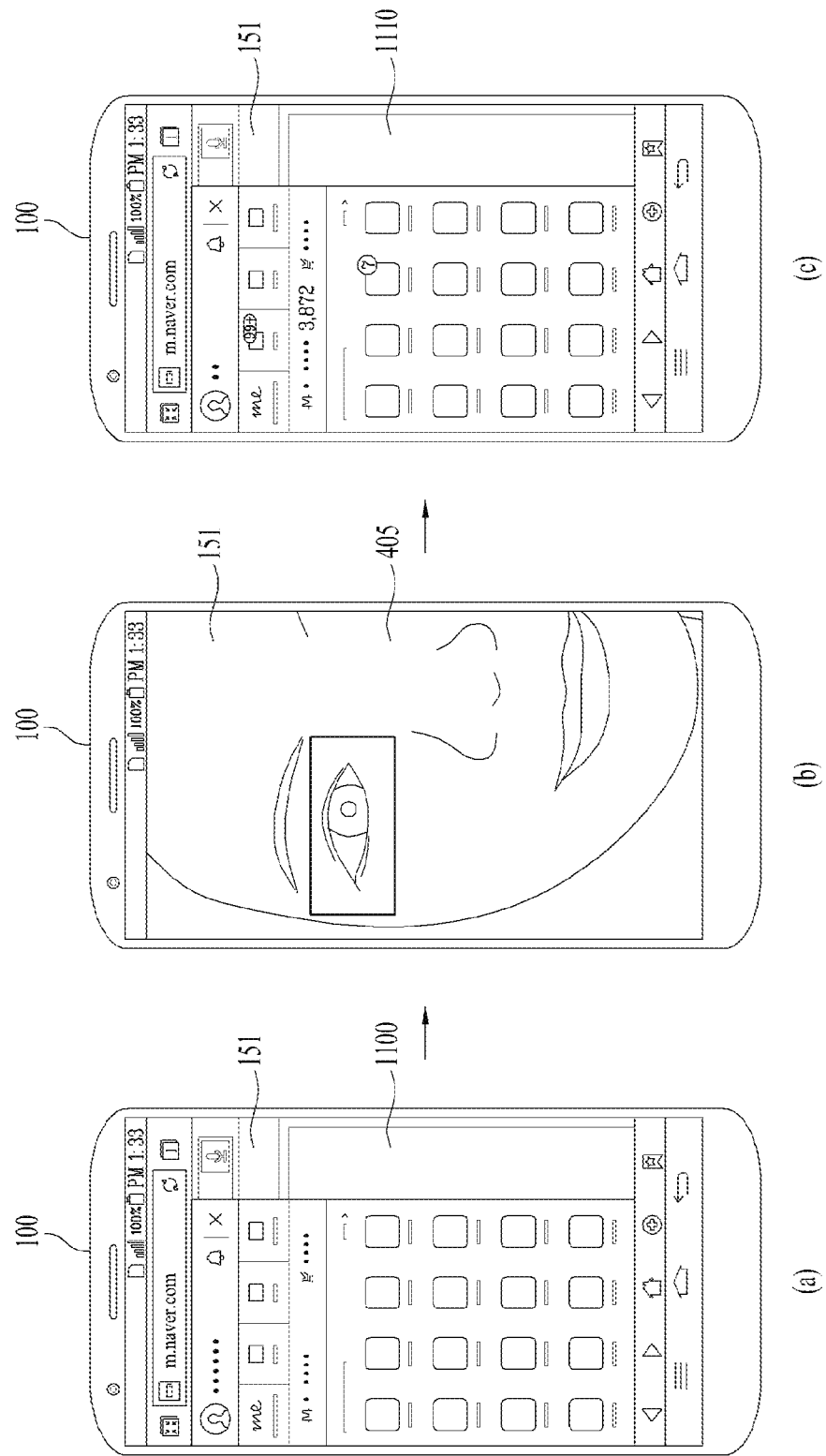
FIG. 11 is a diagram to describe camera activation and user authentication execution in case of a request for user authentication in a mobile terminal according to an embodiment of the present invention.

FIG. 11 is a diagram to describe camera activation and user authentication execution in case of a request for user authentication in a mobile terminal according to an embodiment of the present invention. In this case, assume a case that a user is launching a specific application 1100 through the mobile terminal 100.

Referring to FIG. 11 (*a*), if user authentication is required for running a specific application 1100, the controller 180 can control the camera 121*a* to be activated to enable a first or second user authentication.

FIG. 11 (*b*) shows one example of a case that a second face image 405 is inputted through the activated camera 121 and that the second user authentication is performed based on an iris among face elements.

Referring to FIG. 11 (*c*), the controller 180 can control a user authentication completed screen 1110 of the specific application 1100 to be displayed through the second user authentication. The present embodiment can widely apply to a login to a specific website, a payment for internet shopping, an internet banking service and the like.

Figure 12:
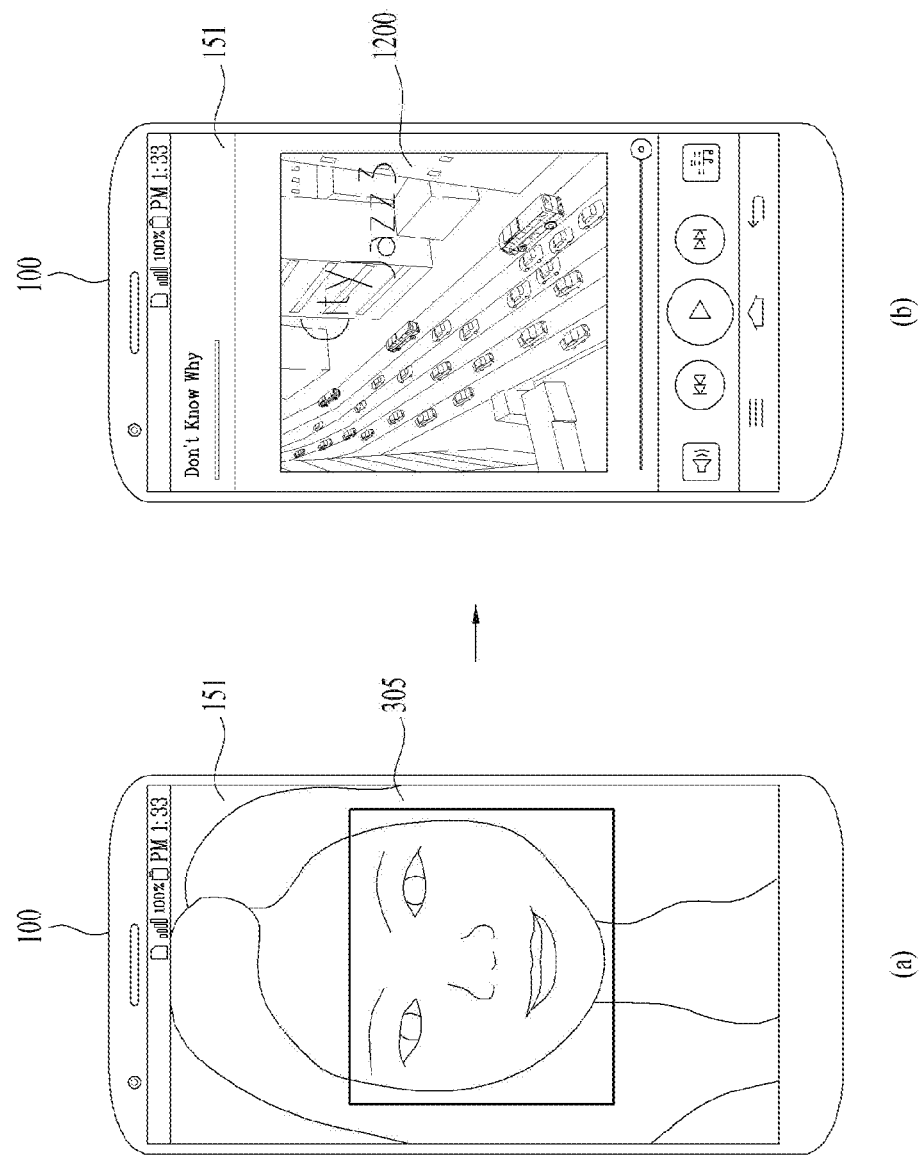
FIG. 12 and FIG. 13 are diagrams to describe a first information and a second information displayed on a display unit as an authentication result by a user authentication scheme according to an embodiment of the present invention.
Figure 13:
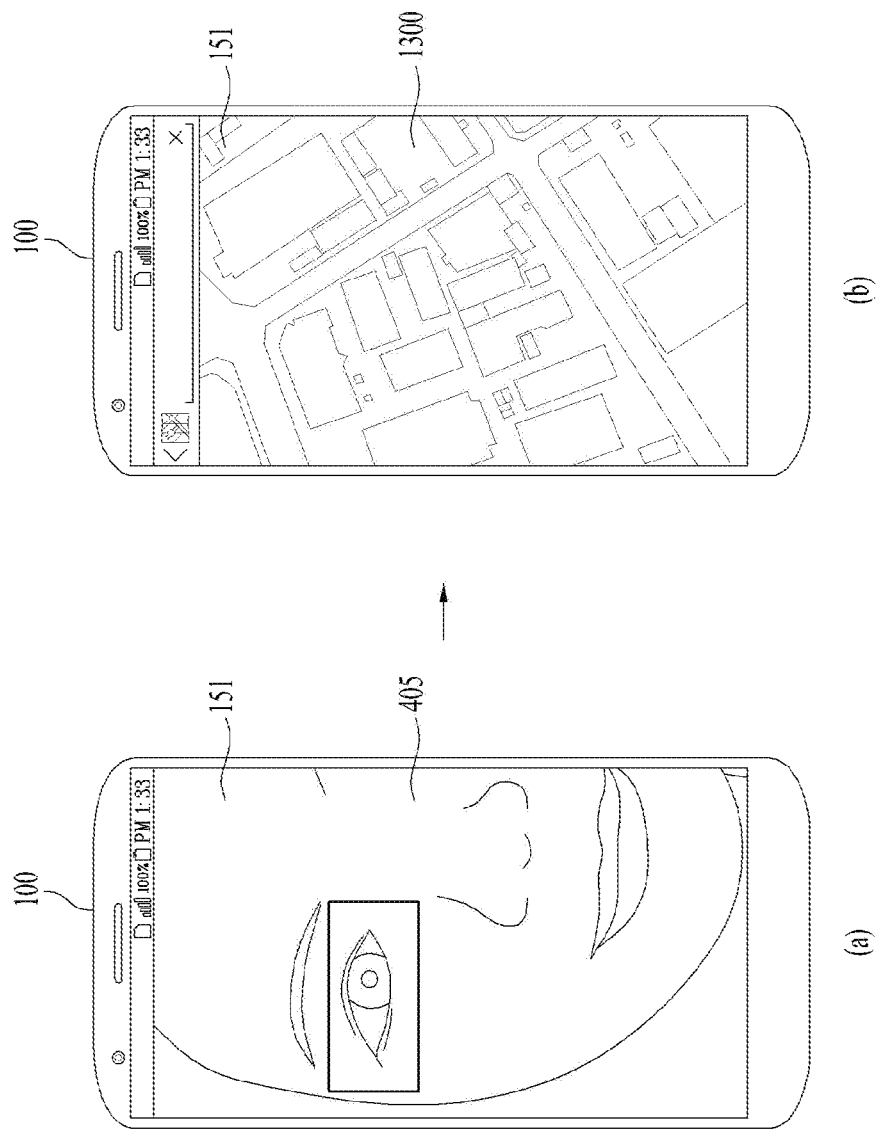

FIG. 12 is a diagram to describe a first information displayed on a display unit as an authentication result according to a first user authentication scheme according to an embodiment of the present invention. FIG. 13 is a diagram to describe a second information displayed on a display unit as an authentication result according to a second user authentication scheme according to an embodiment of the present invention.

In this case, the first information means all targets displayable through the mobile terminal 100. Photo, video, specific webpage, home screen, application list, specific application running screen and the like can be included in the first information. The first information may be stored in the mobile terminal 100 or received from externally.

If a first user authentication is performed, the controller 180 can control the first information to be displayed through the display unit 151.

Referring to FIG. 12 (*a*), if a first face image 305 is inputted through the camera 121*a*, the controller 180 displays it and controls a first user authentication to be performed. Referring to FIG. 12 (*b*), the controller 180 can control the first information to be displayed according to the first user authentication. In this case, as one example of the first information, a running screen 1200 of a music play application is illustrated.

Namely, if the display unit 151 of the mobile terminal 100 is in locked state or the first user authentication is required for launching the music play application, the controller 180 can control the running screen of the music play application to be displayed by performing the first user authentication.

Meanwhile, a second information is an information different from the first information in the concept for the distinguishment from the first information. If a second user authentication is performed, the controller 180 can control the second information to be displayed through the display unit 151.

Referring to FIG. 13 (a), if a second face image 405 is inputted through the camera 121a, the controller 180 displays it and controls a second user authentication to be performed. Referring to FIG. 13 (b), the controller 180 can control the second information to be displayed according to the second user authentication. In this case, as one example of the second information, a running screen 1300 of a map application is illustrated.

Namely, if the display unit 151 of the mobile terminal 100 is in locked state or the second user authentication is required for launching the map application, the controller 180 can control the running screen of the map application to be displayed by performing the second user authentication.

If an unlock of the display unit 151 is performed by the first/second user authentication according to user's or manufacturer's settings, a type of the first/second information displayed by the controller 180 can be determined. Likewise, a specific application allowing itself to be launched by the first or second user authentication can be determined according to user's or manufacturer's settings.

When user authentication is performed using iris recognition, a process for guiding a user to a proper distance of a focus between a user and the camera 121a in performing the iris recognition is described in detail with reference to FIGS. 14 to 22 as follows.

In particular, with reference to FIGS. 14 to 22, a process for informing a user of a real-time difference between a focal distance of a pre-registered optimal iris image in focus and a focal distance of a current iris image received from a camera in the course of iris recognition and guiding the focal distance of the current iris image to match the optimal iris image according to the present invention is described in detail as follows.

Figure 14:
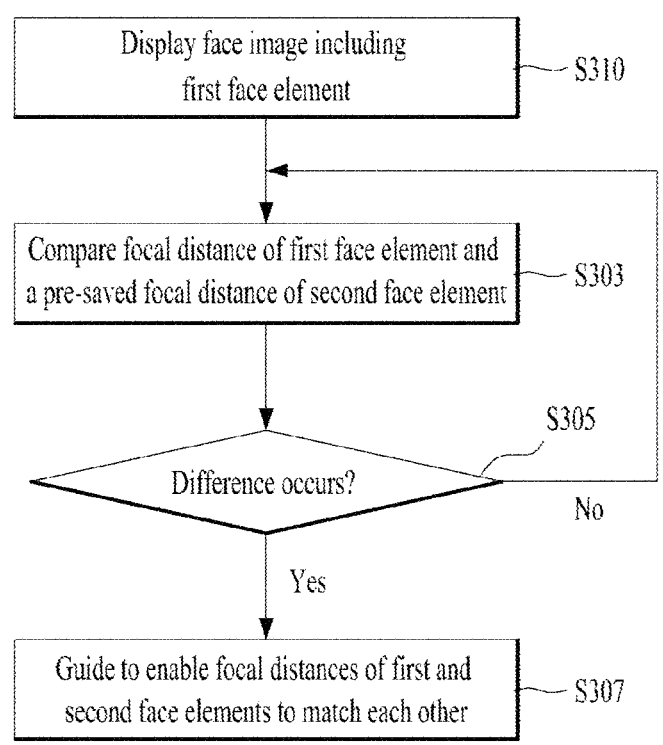
FIG. 14 is a flowchart for an operation of a process for guiding a proper distance between a focused user and a camera in case of iris recognition in a mobile terminal according to an embodiment of the present invention.

FIG. 14 is a flowchart of a process for controlling a mobile terminal according to one embodiment of the present invention.

FIGS. 15 to 22 are diagrams to describe a process for controlling a mobile terminal according to one embodiment of the present invention.

Referring to FIGS. 14 to 22, in user authentication mode (e.g., $2^{nd}$ user authentication mode), the controller 180 activates the camera 121a provided to a plane such as the touchscreen 151. If a face image including a first face element required for user authentication is received from the activated camera 121a, the controller 180 displays a preview screen including the face image on a screen of the touchscreen 151 [S301].

Subsequently, the controller 180 periodically obtains a focal distance of the first face element received through the camera 121a and periodically compares the periodically obtained focal distance of the first face element to a focal distance of a second face element pre-registered at the memory 170 [S303].

In this case, the first and second face elements correspond to the same part in a face and include irises of tow eyes of a user in the present invention.

The focal distance of the second face element includes the number of valid pixels between irises of two eyes in a face image pre-captured in a focused state.

For instance, FIG. 15 (a) shows a state as follows. First of all, in order for to authenticate a user 300 with the mobile terminal 100, a face image 305 of the user 300 is received through the camera 121a. Since an iris 300 is not focused in the face image 305, iris recognition is incomplete eventually.

On the other hand, FIG. 15 (b) shows a state as follows. Since the iris 330 is optimally focused in the face image 300, the iris recognition is successfully complete.

Namely, if a user grips the mobile terminal 100 provided with the camera 121a and then moves the mobile terminal 100 to approach a face in a close distance from a remote distance, the mobile terminal 100 consecutively captures images of the iris 330 through the camera 121a, determines an optimally focused iris image among the captured iris images, obtains the number of valid pixels between itises (or two eyes) in the determined iris image, and then registers information on the obtained valid pixel number as information on a focal distance of the second face element.

In particular, in the step S303, the controller 180 periodically recognizes and tracks two eyes in a face image currently received through the camera 121a, obtains the number of valid pixels between irises of the tracked two eyes, and then periodically compares a difference between the obtained valid pixel number and a valid pixel number pre-registered at the memory 170.

Thus, as a result of the comparison in the step S303, if there is a difference between focal distances of the first and second face elements [S305], the controller 180 performs an operation for guiding to enable the focal distances of the first and second face elements to match each other [S307].

In particular, if the valid pixel number between irises in a face image currently received through the camera 121a fails to match the valid pixel number pre-registered at the memory, the controller 180 guides a movement of the focal distance between the user and the camera 121a to enable a first valid pixel number between the irises in the face image to match the pre-registered valid pixel number.

Meanwhile, the camera 121a is provided with an auto focus adjustment function. If there is a difference between the focal distances of the first and second face elements, the controller 180 can control an auto focus operation of the camera 121 to enable the focal distance of the first face element to match the focal distance of the second face element.

The process shown in FIG. 14 is described in further detail with reference to FIGS. 16 to 22 as follows.

First of all, referring to FIG. 16, the controller 180 displays information 451/452/453 indicating a difference between focal distances of first and second face elements on a preview screen 350 that displays a face image currently received through the camera 121a, thereby providing it to a user.

In particular, if the valid pixel number of the first face element fails to match the pre-registered valid pixel number of the second face element, the controller 180 calculates a focal distance difference in a state that the valid pixel number of the first face element matches the valid pixel number of the second face element and is then able to display the information 511/512/513 indicating the calculated focal distance difference at a preset location within the preview screen 400.

For instance, FIG. 16 (a) shows the most unfocused state in comparison with FIG. 16 (b) or FIG. 16 (c). And, FIG. 16 (a) shows that the camera 121a should approach user's face by '30 cm' in order for the focal distance of the first face element to match the focal distance of the second face element.

For another instance, FIG. 16 (b) shows a state focused better than FIG. 16 (a) but failing to be in complete focus like FIG. 16 (c). And, FIG. 16 (b) shows that the camera 121a should approach user's face by '15 cm' in order for the focal distance of the first face element to match the focal distance of the second face element.

For further instance, FIG. 16 (c) shows a state that the first face element is in complete focus as the focal distance of the first face element matches the focal distance of the second face element.

Subsequently, referring to FIG. 17, as a difference between focal distances of the first and second face elements becomes smaller gradually, the controller 180 controls a first item 461 displayed on the preview screen 350 to be displayed in a manner of being gradually changed into a shape of a third item 463 from a second item 462. As a difference between focal distances of the first and second face elements becomes larger, the controller 180 controls the third item 463 to be displayed in a manner of being gradually changed into a shape of the first item 461 from the second item 462.

Moreover, the controller 180 recognizes user's two eyes in a face image displayed in a preview screen 350, displays a box 460 indicating a boundary of a region including the recognized two eyes, and is able to display the first to third items 461 to 463 on the two eyes in the box 460.

Figure 17:
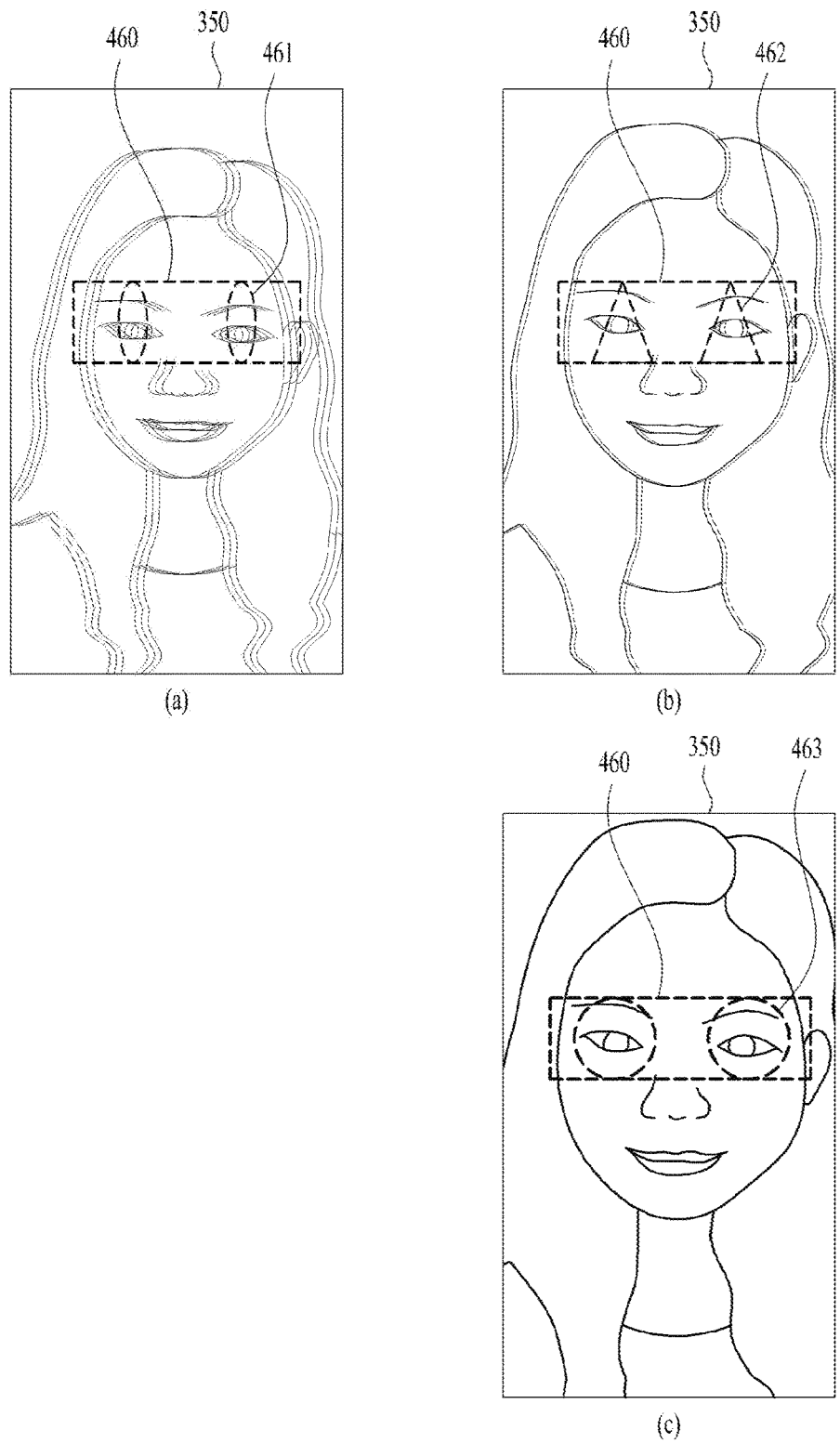

For instance, FIG. 17 (a) shows the most unfocused state in comparison with FIG. 17 (b) or FIG. 17 (c). And, FIG. 17 (a) shows that an oval shape is displayed as the first item 461 on each of the two eyes in the box 460.

For another instance, FIG. 17 (b) shows a state focused better than FIG. 17 (a) but worse than FIG. 17 (c). And, FIG. 17 (b) shows that a triangle shape is displayed as the second item 462 on each of the two eyes in the box 460.

For further instance, FIG. 17 (c) shows a state that the first face element is in complete focus as the focal distance of the first face element matches the focal distance of the second face element. And, FIG. 17 (c) shows that a circle shape is displayed as the third item 463 on each of the two eyes in the box 460.

Namely, as the oval shape gradually changes into the circle shape from the triangle shape, a user can be aware that the iris in the face image displayed by being currently received through the camera 121a becomes focused gradually. As the circle shape gradually changes into the oval shape from the triangle shape, a user can be aware that the iris becomes unfocused gradually.

Referring to FIGS. 18 (a) to 18 (c), as a focal distance difference between the first and second face elements gets gradually smaller, the controller 180 can control a face image displayed on the preview screen 350 to be displayed gradually clearer. As a focal distance difference between the first and second face elements gets gradually larger, the controller 180 can control a face image displayed on the preview screen 350 to be displayed gradually unclear.

Namely, as the face image displayed by being currently received through the camera 121a becomes clearer, a user can be aware that the iris in the face image becomes focused gradually. As the face image gets more unclear, a user can be aware that the iris becomes unfocused gradually.

Referring to FIG. 19, the controller 180 can output a speech for guiding an actual movement between a user face and the camera 121a in order to match a focal distance difference between the first and second face elements and a focal distance between the first and second face elements on the preview screen 350 on which a face image currently received through the camera 121a.

In particular, if the valid pixel number of the first face element fails to match the pre-registered valid pixel number of the second face element, the controller 180 calculates a focal distance difference in a state that the valid pixel number of the first face element matches the valid pixel number of the second face element, and then outputs the speech for guiding the actual movement between the user face and the camera 121a through the audio output unit 152 so that the calculated focal distance difference and the focal distance of the first face element can match the focal distance of the second face element.

For instance, FIG. 19 (a) shows the most unfocused state in comparison with FIG. 19 (b) or FIG. 19 (c). And, FIG. 19 (a) shows that a speech 471 for guiding that the camera 121a should approach user's face by '30 cm' in order for the focal distance of the first face element to match the focal distance of the second face element is outputted.

For another instance, FIG. 19 (b) shows a state focused better than FIG. 19 (a) but worse than FIG. 19 (c). And, FIG. 19 (b) shows that a speech 472 for guiding that the camera 121a should approach user's face by '15 cm' in order for the focal distance of the first face element to match the focal distance of the second face element is outputted.

For further instance, FIG. 19 (c) shows that a speech 473 for announcing a state that the first face element is in complete focus as the focal distance of the first face element matches the focal distance of the second face element.

Figure 20:
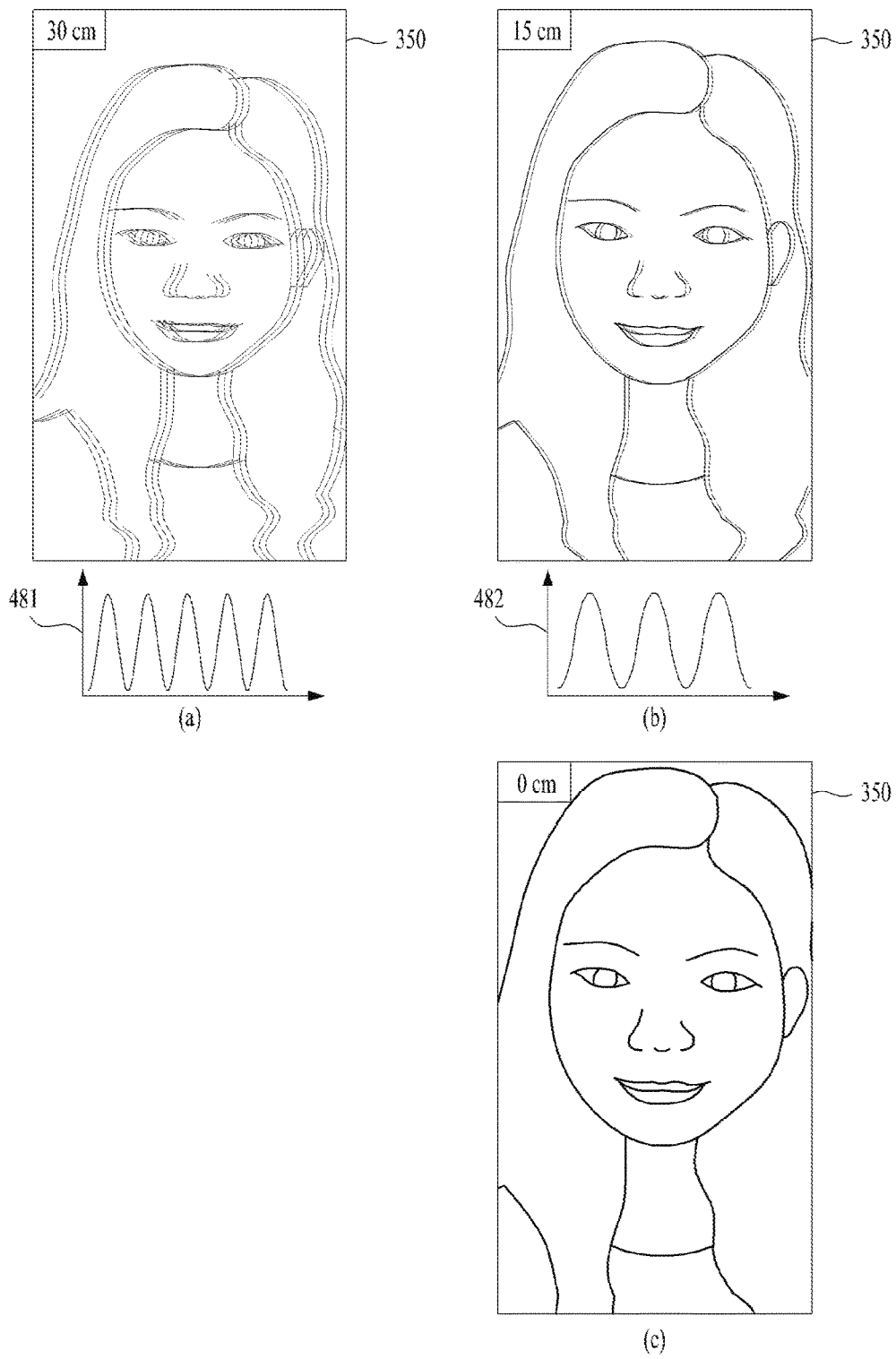

Referring to FIG. 20, the controller 180 can output a vibration effect for guiding an actual movement between a user face and the camera 121a in order to match a focal distance difference between the first and second face elements and a focal distance between the first and second face elements on the preview screen 350 on which a face image currently received through the camera 121a.

In particular, if the valid pixel number of the first face element fails to match the pre-registered valid pixel number of the second face element, the controller 180 calculates a focal distance difference in a state that the valid pixel number of the first face element matches the valid pixel number of the second face element, and then outputs the vibration effect for guiding the actual movement between the user face and the camera 121a through the haptic unit 153 so that the calculated focal distance difference and the focal distance of the first face element can match the focal distance of the second face element.

For instance, FIG. 20 (a) shows the most unfocused state in comparison with FIG. 20 (b) or FIG. 20 (c). And, FIG. 20 (a) shows that a vibration effect 481 for guiding that the camera 121a should approach user's face by '30 cm' in order for the focal distance of the first face element to match the focal distance of the second face element is generated.

For another instance, FIG. 20 (b) shows a state focused better than FIG. 20 (a) but worse than FIG. 20 (c). And, FIG. 20 (b) shows that a vibration effect 482 for guiding that the camera 121a should approach user's face by '15 cm' in order for the focal distance of the first face element to match the focal distance of the second face element is outputted.

For further instance, FIG. 20 (c) shows a state that a vibration effect is not generated because of the first face element in complete focus as the focal distance of the first face element matches the focal distance of the second face element. Of course, a different vibration effect, which indicates a state that the first face element is in complete focus, may be generated.

Meanwhile, referring to FIG. 21 (a), when iris recognition of a user is performed, since user's eyes are set not on the camera 121a but on a screen of the mobile terminal 100 on which a user's figure is displayed, eyeballs in a user face image captured by the camera 121a gaze downward eventually, whereby failure of the iris recognition may often occur.

FIG. 21 (b) shows a state as follows. First of all, in performing iris recognition of a user, when user's eyes are set not on the screen but on the camera 121a, since eyeballs in a user face image captured by the camera 121a gaze in front direction, the iris recognition is successfully performed.

Figure 22:
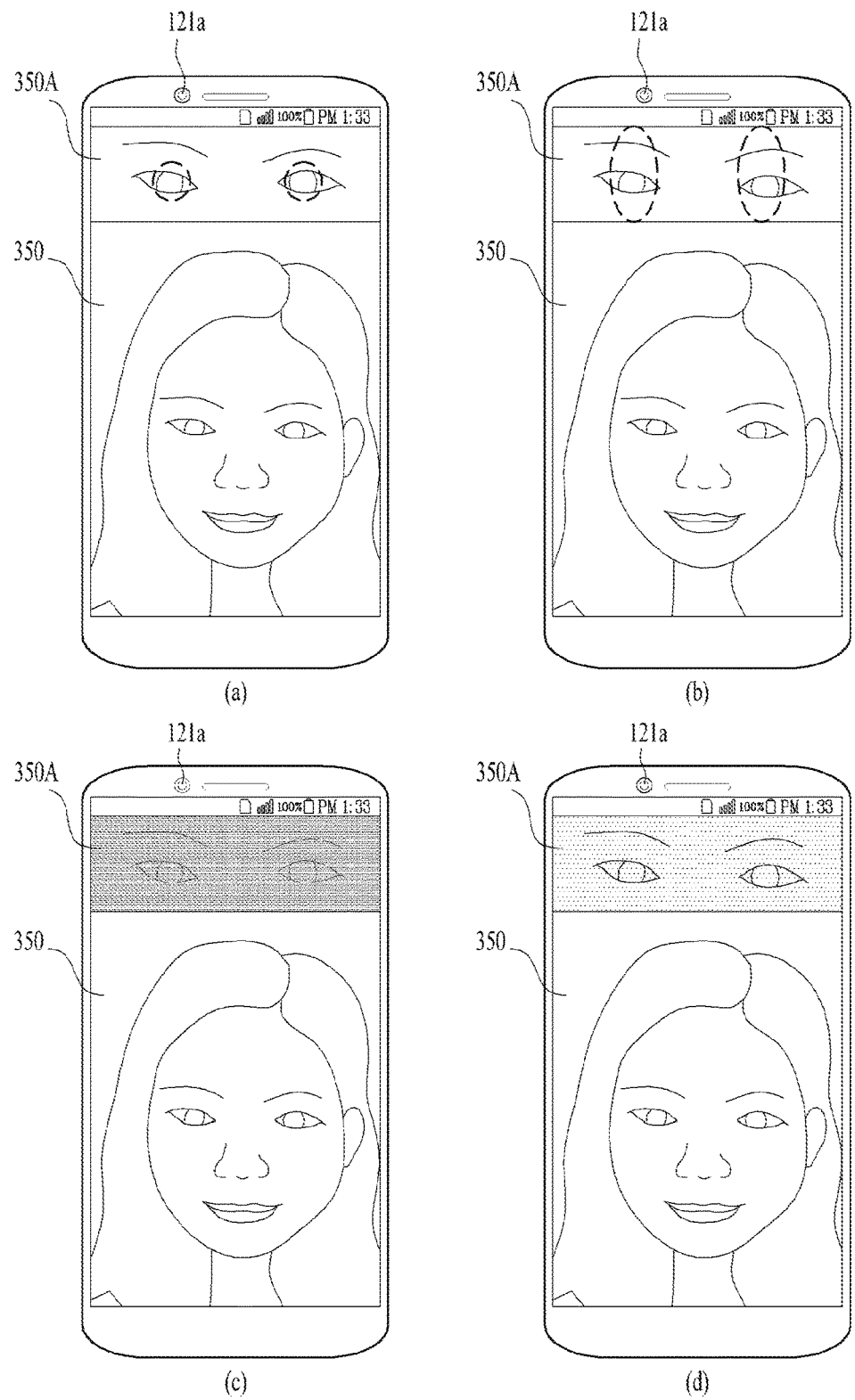

Hence, referring to FIG. 22, the controller 180 recognizes locations of two eyes corresponding to a first face element from a face image received from the camera 121a, extracts, copies or crops a region containing the recognized two eyes, and then displays the extracted region on a place adjacent to a camera installed portion within a preview screen on which the face image is displayed.

In particular, the controller 180 partitions the preview screen into a first region 350 and a second region 350A, displays the whole face image received from the camera 121a on the first region 350, and is able to display the region, which contains the two eyes in the face image, on the second region 350A.

In doing so, as mentioned in the foregoing description with reference to FIG. 17, since the face image received from the camera 121a has no difference from a pre-registered face image in a focal distance between two eyes, FIG. 22 (a) shows that a circle item is displayed on each of the two eyes displayed within the second region 350A. Moreover, since the face image received from the camera 121a has a difference from a pre-registered face image in a focal distance between two eyes, FIG. 22 (b) shows that an oval item is displayed on each of the two eyes displayed within the second region 350A.

Moreover, since the face image received from the camera 121a has no difference from the pre-registered face image in a focal distance between two eyes, FIG. 22 (c) shows that the second region 350A is displayed clearly. Since the face image received from the camera 121a has a difference from the pre-registered face image in a focal distance between two eyes, FIG. 22 (d) shows that the second region 350A is displayed unclearly.

It will be appreciated by those skilled in the art that the present invention can be specified into other form(s) without departing from the spirit or scope of the inventions.

In addition, the above-described methods can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). Further, the computer may include the controller 180 of the terminal.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
a memory;
a camera configured to receive an image:
a display unit configured to display an image received via the camera; and
a controller configured to:
perform a first user authentication based on a first face image when the first face image, including face elements required for the first user authentication, is received via the camera;
cause the display unit to display an execution screen of a first application corresponding to the first user authentication after performing the first user authentication;
perform a second user authentication using at least one face element included in a second face image when the second face image, lacking at least one of the face elements, is received via the camera; and
cause the display unit to display an execution screen of a second application corresponding to the second user authentication after performing the second user authentication,
wherein:
the second face image includes a first face element;
the memory stores focal distance information of a second face element required for the second user authentication; and
when a difference between a focal distance of the first face element in the second face image and a focal distance of the stored second face element is generated, the controller is further configured to perform an operation of guiding the focal distances of the first and second face elements to match each other.

2. The mobile terminal of claim 1, wherein when at least one of the face elements included in the first face image is selected, the controller performs the second user authentication based on the selected at least one of the face elements only.

3. The mobile terminal of claim 2, wherein the controller is further configured to cause the display unit to display the selected at least one of the face elements in the first face image, wherein the displayed at least one of the face elements is enlarged.

4. The mobile terminal of claim 2, wherein the controller controls the camera to be focused on the selected at least one of the face elements.

5. The mobile terminal of claim 1, wherein when a valid user is confirmed via the first user authentication or the second user authentication in a locked state of a screen of the display unit, the controller controls a screen lock of the display unit to be released.

6. The mobile terminal of claim 1, wherein the controller is further configured to cause the display unit to display the received second face image including the at least one face element required for the second user authentication.

7. The mobile terminal of claim 1, wherein:
the first face image includes at least two face elements;
the first user authentication is performed via recognition of the at least two face elements in the first face image; and
the second user authentication is performed via recognition of iris included in the second face image.

8. The mobile terminal of claim 1, wherein the first and second face elements comprise irises of two eyes of a user.

9. The mobile terminal of claim 8, wherein:
the focal distance information comprises a number of valid pixels between the irises in a pre-captured face image in a focused state; and the controller compares a real-time difference between a valid pixel number between irises in the second face image and the valid pixel number between the irises in the pre-captured face image.

10. The mobile terminal of claim 1, wherein the controller controls a focus operation of the camera to enable the focal distance of the first face element to automatically match the focal distance of the stored focal distance of the second face element.

11. The mobile terminal of claim 1, further comprising an audio output unit, wherein the controller controls the audio output unit to output a speech indicating a difference between the focal distance of the first face element and the focal distance of the second face element.

12. The mobile terminal of claim 11, wherein the controller controls the audio output unit to output the speech for guiding an actual movement between a user face and the camera in order that the focal distance of the first face element and the focal distance of the second face element match each other.

13. The mobile terminal of claim 1, further comprising a haptic unit, wherein the controller controls the haptic unit to generate a vibration effect indicating a difference between the focal distance of the first face element and the focal distance of the second face element.

14. The mobile terminal of claim 13, wherein the controller controls the haptic unit to output the vibration effect for guiding an actual movement between a user face and the camera in order that the focal distance of the first face element and the focal distance of the second face element match each other.

15. The mobile terminal of claim 1, wherein the controller is further configured to cause the display unit to display information indicating the difference between the focal distance of the first face element and the focal distance of the second face element on the second face image.

16. The mobile terminal of claim 1, wherein:
when the difference between the focal distance of the first face element and the focal distance of the second face element on the second face image gets bigger, the controller is further configured to cause the display unit to display the second face image unclearly; and
when the difference between the focal distance of the first face element and the focal distance of the second face element on the second face image gets smaller, the controller is further configured to cause the display unit to display the second face image clearly.

17. The mobile terminal of claim 1, wherein:
when the difference between the focal distance of the first face element and the focal distance of the second face element on the second face image gets bigger, the controller controls a first item displayed on the second face image to be displayed in a manner of gradually changing into a second item; and
when the difference between the focal distance of the first face element and the focal distance of the second face element on the second face image gets smaller, the controller controls the second item to be displayed in a manner of gradually changing into the first item.

18. The mobile terminal of claim 1, wherein the controller is further configured to:
extract a region containing the first face element from the second face image; and
cause the display unit to display an image of the extracted region on a region adjacent to a part having the camera installed in the second face image.

19. A method of controlling a mobile terminal, comprising:
receiving a first face image, including face elements required for a first user authentication, via a camera;
displaying the received first face image;
performing the first user authentication based on the received first face image;
displaying an execution screen of a first application corresponding to the first user authentication after performing the first user authentication;
receiving a second face image, lacking at least one of the face elements, via the camera, the second face image including a first face element;
displaying the received second face image including at least one face element required for a second user authentication;
performing the second user authentication using the at least one face element included in the received second face image;
displaying an execution screen of a second application corresponding to the second user authentication after performing the second user authentication;
storing, in a memory, focal distance information of a second face element required for the second user authentication; and when a difference between a focal distance of the first face element in the second face image and a focal distance of the stored second face element is generated, performing an operation of guiding the focal distances of the first and second face elements to match each other.

* * * * *